(12) United States Patent
Crowthers et al.

(10) Patent No.: US 8,835,587 B2
(45) Date of Patent: Sep. 16, 2014

(54) CATALYST SYSTEM, PROCESS FOR OLEFIN POLYMERIZATION, AND POLYMER COMPOSITIONS PRODUCED THEREFROM

(71) Applicant: ExxonMobil Chemical Patents Inc., Baytown, TX (US)

(72) Inventors: Donna J. Crowthers, Seabrook, TX (US); Peijun Jiang, League City, TX (US); Rainer Kolb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 14/049,558

(22) Filed: Oct. 9, 2013

(65) Prior Publication Data

US 2014/0038486 A1 Feb. 6, 2014

Related U.S. Application Data

(62) Division of application No. 12/541,752, filed on Aug. 14, 2009, now Pat. No. 8,580,902.

(51) Int. Cl.
| | |
|---|---|
| *C08F 210/02* | (2006.01) |
| *C08F 210/06* | (2006.01) |
| *B01J 31/22* | (2006.01) |
| *B01J 31/16* | (2006.01) |
| *C08F 210/16* | (2006.01) |
| *C08F 10/06* | (2006.01) |
| *B01J 31/14* | (2006.01) |
| *C08F 4/6592* | (2006.01) |
| *B01J 31/02* | (2006.01) |
| *C08F 4/659* | (2006.01) |
| *C08F 110/06* | (2006.01) |

(52) U.S. Cl.
CPC ............ *C08F 210/06* (2013.01); *B01J 31/0235* (2013.01); *B01J 2531/40* (2013.01); *C08F 210/02* (2013.01); *B01J 31/0201* (2013.01); *B01J 31/2295* (2013.01); *B01J 31/0255* (2013.01); *B01J 31/0254* (2013.01); *B01J 31/1616* (2013.01); *B01J 31/1608* (2013.01); *B01J 2531/0269* (2013.01); *B01J 2531/49* (2013.01); *B01J 2531/0297* (2013.01); *C08F 4/65912* (2013.01); *B01J 2531/48* (2013.01); *C08F 110/06* (2013.01); *C08F 4/65916* (2013.01); *C08F 210/16* (2013.01); *C08F 4/65927* (2013.01); *C08F 10/06* (2013.01); *B01J 31/146* (2013.01); *B01J 31/0239* (2013.01); *B01J 2231/122* (2013.01); *Y10S 526/943* (2013.01)
USPC ........... 526/348; 526/133; 526/134; 526/165; 526/943

(58) Field of Classification Search
CPC ............................. C08F 210/06; C08F 210/02
USPC .......... 526/133, 134, 165, 348, 943
See application file for complete search history.

(56) References Cited

U.S. PATENT DOCUMENTS

| | | |
|---|---|---|
| 3,248,179 A | 4/1966 | Norwood |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,892,851 A | 1/1990 | Ewen et al. |
| 5,008,204 A | 4/1991 | Stehling |
| 5,017,714 A | 5/1991 | Welborn, Jr. |
| 5,028,670 A | 7/1991 | Chinh et al. |
| 5,132,281 A | 7/1992 | Chevallier et al. |
| 5,153,157 A | 10/1992 | Hlatky et al. |
| 5,155,080 A | 10/1992 | Elder et al. |
| 5,171,919 A | 12/1992 | Watanabe et al. |
| 5,278,264 A | 1/1994 | Spaleck et al. |
| 5,296,434 A | 3/1994 | Karl et al. |
| 5,317,036 A | 5/1994 | Brady, III et al. |
| 5,318,935 A | 6/1994 | Canich et al. |
| 5,352,749 A | 10/1994 | DeChellis et al. |
| 5,405,922 A | 4/1995 | DeChellis et al. |
| 5,416,177 A | 5/1995 | Siedle et al. |
| 5,436,304 A | 7/1995 | Griffin et al. |
| 5,447,895 A | 9/1995 | Marks et al. |
| 5,453,471 A | 9/1995 | Bernier et al. |
| 5,462,999 A | 10/1995 | Griffin et al. |
| 5,513,157 A | 4/1996 | Saito et al. |
| 5,616,661 A | 4/1997 | Eisinger et al. |

(Continued)

FOREIGN PATENT DOCUMENTS

| | | |
|---|---|---|
| DE | 2 116 439 | 10/1972 |
| EP | 0 277 003 | 8/1988 |
| EP | 0 277 004 | 8/1988 |
| EP | 0 507 876 | 10/1992 |
| EP | 0 511 665 | 11/1992 |

(Continued)

OTHER PUBLICATIONS

Bibal, C. et al., "A Selective Synthesis of Hydroxyborate Anions as Novel Anchors for Zirconocene Catalysts," *Dalton Transactions*, pp. 2866-2870 (2008).

(Continued)

*Primary Examiner* — Caixia Lu

(57) ABSTRACT

Provided are catalyst systems, processes for polymerizing one or more olefins, polymers resulting therefrom, and articles prepared from such polymers. The processes comprise contacting under polymerization conditions one or more olefin monomers, preferably propylene, with a catalyst system comprising a transition metal compound and an activator of the formula (1) or (2) as described herein. The polymer compositions described herein exhibit advantageously narrow composition distributions and high melting points in comparison to conventional polymers having the same comonomer content. The polymers described herein exhibit improved properties, e.g., pellet stability, impact properties, heat seal properties, and structural integrity in film and fabricated parts applications.

14 Claims, 4 Drawing Sheets

(56) References Cited

U.S. PATENT DOCUMENTS

| | | |
|---|---|---|
| 5,668,228 A | 9/1997 | Chinh et al. |
| 5,817,590 A | 10/1998 | Hasegawa et al. |
| 5,969,070 A | 10/1999 | Waymouth et al. |
| 6,034,187 A | 3/2000 | Maehama et al. |
| 6,121,395 A | 9/2000 | Turner |
| 6,177,376 B1 | 1/2001 | Fritze et al. |
| 6,376,409 B1 | 4/2002 | Burkhardt et al. |
| 6,376,412 B1 | 4/2002 | Burkhardt et al. |
| 6,380,120 B1 | 4/2002 | Burkhardt et al. |
| 6,399,722 B1 | 6/2002 | Szul et al. |
| 7,034,078 B2 * | 4/2006 | Cozewith et al. ............. 525/240 |
| 7,094,901 B2 | 8/2006 | Babb et al. |
| 7,101,940 B2 | 9/2006 | Schottek et al. |
| 7,217,676 B2 | 5/2007 | Rodriguez et al. |
| 7,294,681 B2 | 11/2007 | Jiang et al. |
| 7,601,666 B2 | 10/2009 | Rix et al. |
| 2004/0072975 A1 | 4/2004 | Schottek et al. |
| 2004/0122191 A1 | 6/2004 | Arjunan et al. |
| 2004/0138392 A1 | 7/2004 | Jiang et al. |
| 2005/0009688 A1 | 1/2005 | Babb et al. |
| 2008/0015316 A1 | 1/2008 | Lin et al. |
| 2008/0188635 A1 | 8/2008 | Brant et al. |
| 2010/0029871 A1 | 2/2010 | Crowther et al. |
| 2010/0029873 A1 | 2/2010 | Crowther et al. |

FOREIGN PATENT DOCUMENTS

| | | |
|---|---|---|
| EP | 0 577 581 | 1/1994 |
| EP | 0 578 838 | 1/1994 |
| EP | 0 630 910 | 12/1994 |
| EP | 1 650 236 | 4/2006 |
| EP | 1 661 900 | 5/2006 |
| JP | 2004-035730 | 2/2004 |
| WO | WO 91/02012 | 2/1991 |
| WO | WO 92/10066 | 6/1992 |
| WO | WO 93/19103 | 9/1993 |
| WO | WO 99/07788 | 2/1999 |
| WO | WO 99/29743 | 6/1999 |
| WO | WO 99/60033 | 11/1999 |
| WO | WO 00/59961 | 10/2000 |
| WO | WO 01/30862 | 5/2001 |
| WO | WO 01/42249 | 6/2001 |
| WO | WO 01/48034 | 7/2001 |
| WO | WO 01/48035 | 7/2001 |
| WO | WO 01/62764 | 8/2001 |
| WO | WO 01/68718 | 9/2001 |
| WO | WO 03/035708 | 5/2003 |
| WO | WO 03/040201 | 5/2003 |
| WO | WO 2004/005360 | 1/2004 |
| WO | WO 2004/026921 | 4/2004 |
| WO | WO 2004/056953 | 7/2004 |
| WO | WO 2004/058828 | 7/2004 |
| WO | WO 2005/016980 | 2/2005 |
| WO | WO 2010/014344 | 2/2010 |

OTHER PUBLICATIONS

Foncante, F. et al., "Complexes of tris(pentafluorophenyl)boron with nitrogen-containing compounds: Synthesis, reactivity and metallocene activation," *Coordination Chemistry Reviews*, vol. 250 (2006), pp. 170-188. (XP002608301).

Giardello, M.A. et al., "Chiral $C_1$-Symmetric Group 4 Metallocenes as Catalysts for Stereoregular α-Olefin Polymerization, Metal, Ancillary Ligand, and Counteranion Effects," *Journal of the American Chemical Society*, vol. 117, pp. 12114-12129 (1995).

Lauterwasser, F. et al., "Scandium-Catalyzed Intramolecular Hydroamination. Development of a Highly Active Cationic Catalyst," *Organometallics*, vol. 23, pp. 2234-2237 (2004).

Periodic Table of the Elements, *Chemical and Engineering News*, vol. 63(5), p. 27 (1985).

Pine, H. et al., "Organic Chemistry," Fourth Edition, McGraw-Hill, 1980.

Randall, J.C., "Long-Chain Branching in Polyethylene," *Journal of Macromolecular Science—Reviews in Macromolecular Chemistry and Physics*, vol. C29, Nos. 2&3, pp. 285-297 (1989).

Sanginov, E.A. et al., "Metallocene Systems in Propylene Polymerization: Effect of Triisobutylaluminum and Lewis Bases on the Behavior of Catalysts and Properties of Polymers," *Polymer Science*, Ser. A, vol. 48, No. 2, pp. 99-106 (2006).

Spaleck, W. et al., "The Influence of Aromatic Substituents on the Polymerization Behavior of Bridged Zirconocene Catalysts," *Organometallics*, vol. 13, pp. 954-963 (1994).

Stehling, U. et al., "ansa-Zirconocene Polymerization Catalysts with annelated Ring Ligands—Effects on Catalytic Activity and Polymer Chain Length," *Organometallics*, vol. 13, pp. 964-970.

Sun, T. et al., "Effect of Short Chain Branching on the Coil Dimensions of Polyolefins in Dilute Solution," *Macromolecules*, vol. 34, pp. 6812-6820 (2001).

Wild, L. et al., "Determination of Branching Distributions in Polyethylene and Ethylene Copolymers," *Journal of Polymer Science: Polymer Physics Edition*, vol. 20, Issue 3, pp. 441-455 (1982).

Wittig, G. et al., "Über neue Triaryl-bor-Verbindungen und ihre Tetraarylo-borat-Komplexe," *Chemische Berichte*, vol. 88, pp. 962-969 (1955).

Yano, A. et al., "Influence of activators on ethylene polymerization with diphenylmethylidene-(cyclopentadienyl)(fluorenyl)zirconium dichloride catalysts at high temperature," Journal of Molecular Catalysis A: Chemical, vol. 48 (1999), pp. 77-86. (XP001037764).

* cited by examiner

CATALYST SYSTEM, PROCESS FOR OLEFIN POLYMERIZATION, AND POLYMER COMPOSITIONS PRODUCED THEREFROM

CROSS-REFERENCE TO RELATED APPLICATIONS

This application is a continuation-in-part and claims the benefit of priority from U.S. patent application Ser. No. 12/184,713, filed on Aug. 1, 2008, entitled "Catalyst System and Process for Olefin Polymerization" the disclosure of which is herein incorporated by reference.

PRIORITY CLAIM

This application is a divisional of U.S. application Ser. No. 12/541,752, filed Aug. 14, 2009 (now allowed), and is incorporated herein by reference in its entirety.

FIELD OF THE INVENTION

This invention relates to a new catalyst system that includes a transition metal compound and an activator, the activator comprising a non-coordinating anion and a cyclic cation. The invention also relates to processes for polymerizing olefins using such and related catalyst systems. The invention further relates to the polymers produced therefrom.

BACKGROUND OF THE INVENTION

Olefin polymerization catalysts are of great use in industry. Hence there is interest in finding new catalyst systems, including catalyst activators that increase the polymerization activity of the catalyst and allow the production of polymers having specific properties, such as high melting point and high molecular weight.

Catalysts for olefin polymerization are often based on metallocenes as catalyst precursors, which are activated either with the help of an alumoxane, or with an activator containing a non-coordinating anion.

There is still a need in the art for new and improved catalyst systems having good activity for the polymerization of olefins, in order to achieve specific polymer properties, such as high melting point, high molecular weights or to increase conversion without deteriorating the resulting polymer's properties. Also, in propylene polymerization increased propylene conversion often goes along with a decrease in molecular weight.

SUMMARY OF THE INVENTION

Provided is a catalyst system comprising a transition metal compound and an activator, the activator having the formula (1):

$$[R^1R^2R^3AH]^+[Y]^-, \quad (1)$$

wherein:
[Y]$^-$ is a non-coordinating anion (NCA),
A is nitrogen or phosphorus,
R$^1$ and R$^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and R$^3$ is a hydrogen atom or $C_1$ to $C_{10}$ alkyl, or R$^3$ is a $C_1$ to $C_{10}$ alkylene group that connects to said first ring and/or to said at least one second ring or ring system.

The present invention also relates to a process for polymerizing one or more olefins, comprising contacting under polymerization conditions one or more olefin monomers, preferably propylene, with a catalyst system comprising a transition metal compound and an activator of the formula (1) as defined above.

Equally, the present invention relates to the use of a compound of formula (1) as defined above in a catalyst system for the polymerization of one or more olefins, preferably propylene, as activator of a transition metal compound.

The invention furthermore relates to a process for polymerizing one or more olefins, comprising contacting under polymerization conditions one or more olefin monomers with a catalyst system comprising a transition metal compound and an activator of the following formula (2):

$$[R_nAH]^+[Y]^-, \quad (2)$$

wherein [Y]$^-$ is a non-coordinating anion (NCA),
A is nitrogen, phosphorus or oxygen,
n is 3 if A is nitrogen or phosphorus, and n is 2 if A is oxygen, and the groups R are identical or different and are a $C_1$ to $C_3$ alkyl group, wherein the weight average molecular weight (Mw) of the polymer formed increases or at least does not substantially decrease with increasing monomer conversion at a given reaction temperature.

The present invention also relates to polymers obtainable from catalysts described herein via any of the above-described processes. In particular, the present invention relates to copolymer compositions comprising units derived from propylene and ethylene, where the melting point of the composition satisfies the relation:

$$Tm > -6.2*e + 125,$$

where e is the ethylene content of the composition, in weight percent. These compositions additionally have a density less than about 0.900 g/cm$^3$, and comprise less than about 40 wt % units derived from ethylene. In some embodiments of the present invention, copolymer compositions satisfying this relationship between melting temperature and ethylene content are obtained from a process which employs an activator of formula (2), as described above.

These polymer compositions described herein exhibit advantageously narrow composition distributions and high melting points in comparison to previously known polymers having the same comonomer content. These polymer compositions also have a lower amorphous content. As a result, the polymers described herein exhibit improved properties such as pellet stability, impact properties, heat seal properties, and structural integrity in film and fabricated parts applications.

BRIEF DESCRIPTION OF THE DRAWINGS

In FIGS. 2a, 2b, 3a, and 3b "Me3" is trimethyl.

DEFINITIONS

Figure 1:
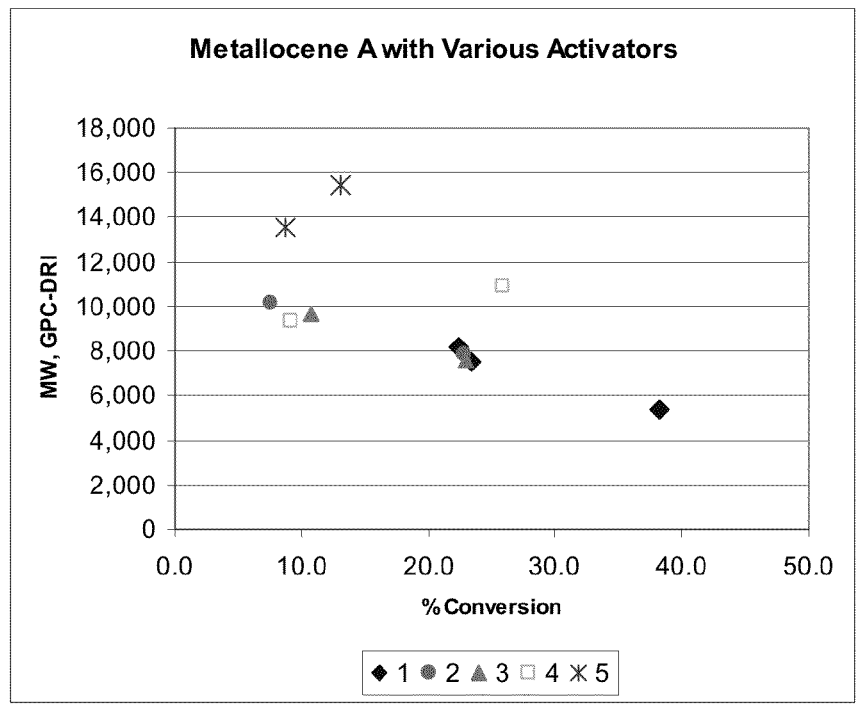
FIG. 1 shows weight average molecular weight (g/mol) versus propylene conversion of the resulting polymer in a propylene polymerization reaction conducted batch-wise at a temperature of 120° C. with rac-dimethylsilylbis(indenyl) hafnium dimethyl and different cation/NCA activators, both according to the present invention as well as comparative, see Example 1.

For the purposes of this invention, a "catalyst system" is a combination of different components that, taken together, provide the active catalyst. A catalyst system of the present invention therefore comprises at least a transition metal compound (also referred to herein as "precatalyst" or "catalyst precursor", these two terms being identical in meaning and being used interchangeably) and an activator. An activator is also sometimes referred to as a "co-catalyst" (again, these three terms are all identical in meaning and are used interchangeably). The activator activates the transition metal compound and converts it into its catalytically active form. For example, an activator converts a neutral metallocene compound into its cationic form, which is the catalytically active species. When the term "catalyst system" is used to describe a catalyst/activator pair before activation, it refers to the unactivated catalyst (i.e., the precatalyst) together with an activator. When this term is used to describe a catalyst/activator pair after activation, it refers to the activated catalyst and the charge-balancing anion derived from the activator or other charge-balancing moiety. The actual catalyst may be generated only shortly before or while it is being contacted with the reactants (in the case of a polymerization reaction the monomers). Usually, catalysts are commercially offered and shipped in the form of neutral compounds (e.g., the neutral metallocene compound). In the scientific and commercial literature the term "catalyst" is sometimes used to refer to the non-activated (i.e., neutral and stable) metallocene, which still has to be converted to its respective charged form in order to react with the monomers to produce polymer. The catalyst system may be in the form of an actual composition prepared from the transition metal compound and the activator (thus resulting in an activated cationic catalyst, a counter-anion and additional components originating from the activator, such as a free Lewis base), or in the form of a "kit" containing, separately, the transition metal compound and the activator to be combined whenever needed. Such "kit" may also contain, separately or combined with either the transition metal compound or the activator or both, additional components that are conventionally used in polymerization reactions, such as scavenging compounds etc. Finally, the components of the catalyst system may, either separately or jointly, be supported on a solid support, such as alumina or silica.

A scavenger is a compound that is typically added to facilitate polymerization by scavenging impurities (poisons that would otherwise react with the catalyst and deactivate it). Some scavengers may also act as activators, and they may also be referred to as co-activators. A co-activator may be used in conjunction with an activator in order to form an active catalyst.

For the purposes of this invention, it is understood that whenever a polymer is referred to as "comprising" an olefin or other monomer, the olefin present in the polymer is the polymerized form of the olefin or other monomer, respectively. Mw refers to the weight average molecular weight, Mn to the number average molecular weight and Mz to the Z-average molecular weight. All molecular weights are g/mol unless otherwise noted. A "reactor", as referred to herein, is understood to be any container(s) in which a chemical reaction occurs. As used herein, Me is methyl, Et is ethyl, t-Bu and $^t$Bu are tertiary butyl, nBu and nBu are n-butyl, iPr and $^i$Pr are isopropyl, Cy is cyclohexyl, THF (also referred to as thf) is tetrahydrofuran, Bn is benzyl, and Ph is phenyl.

As used herein, the numbering scheme for the Periodic Table Groups is as published in Chemical and Engineering News, 63(5), 27 (1985).

The terms "radical", "group", and "substituent" are used interchangeably herein and indicate a group that is bound to a certain atom as indicated herein. A "substituted" group is one where a hydrogen has been replaced by a hydrocarbyl, a heteroatom or a heteroatom containing group. For example, methyl cyclopentadiene is a cyclopentadiene substituted with a methyl group.

The term "hydrocarbyl" is used herein to refer to any hydrocarbon-derived substituent or group and thus is understood to include, without limitation, linear, branched or cyclic alkyl, alkylene, alkene, alkine, as well as aryl groups. Any of these groups may be substituted or unsubstituted.

The term "alkyl" is used herein to refer to an aliphatic, branched or linear, non-cyclic or cyclic substituent typically with a certain number of carbon atoms as individually specified. Unless specified otherwise herein, "alkyl" specifically includes aliphatic groups having from 1 to 20, preferably from 1 to 10, and more preferably from 1 to 5 carbon atoms, and specifically methyl, ethyl, propyl, n-propyl, isopropyl, butyl, n-butyl, isobutyl, pentyl, n-pentyl, isopentyl, cyclopentyl, hexyl, n-hexyl, isohexyl, cyclohexyl, heptyl, n-heptyl, isohexyl, cycloheptyl, octyl, n-octyl, isooctyl, cyclooctyl, nonyl, n-nonyl, isononyl, decyl, n-decyl, iso-decyl and the like. The same definition applies for the alkyl in an alkoxy substituent.

The term "aryl" is used herein to refer to an aromatic substituent, which may be a single aromatic ring or multiple aromatic rings, which are fused together, covalently linked, or linked to a common group such as a methylene or ethylene moiety. The common linking group may also be a carbonyl as in benzophenone or oxygen as in diphenylether. The aromatic ring(s) may include phenyl, naphthyl, fluorenyl, indenyl, biphenyl, diphenylether, tolyl, cumyl, xylyl, and benzophenone, among others. Unless specified otherwise herein, the term "aryl" specifically includes those having from 5 to 30, preferably from 5 to 25 more preferably from 5 to 20, and more preferably from 5 to 15 carbon atoms, alternately the aryl may have 6 to 15 carbon atoms or may have 5 or 6 carbon atoms. "Substituted aryl" refers to aryl as just described in which one or more hydrogen atoms to any carbon are, independently of each other, replaced by one or more groups such as alkyl, substituted alkyl, cycloalkyl, substituted cycloalkyl, heterocycloalkyl, substituted heterocycloalkyl, halogen, alkylhalogen, such as hydroxyl-, phosphino-, alkoxy-, aryloxy-, amino-, thio- and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. The term "aryl" also includes aromatic groups containing one or more heteroatoms, such as nitrogen, oxygen, phosphorus or sulfur. Non-limiting examples of such hetero-atom containing aromatic groups are furanyl, thiophenyl, pyridinyl, pyrrolyl, imidazolyl, pyrazolyl, benzofuranyl, pyrazinyl, pyrimidinyl, pyridazinyl, chinazolinyl, indolyl, carbazolyl, oxazolyl, thiazolyl, and the like.

The term "ring system" refers to any system or combination of aliphatic and/or aromatic rings that are fused to each other via shared ring member atoms, that are covalently linked to each other or that are linked via a common linking group, such as an alkylene group or a hetero-atom containing group such as carbonyl. One or more of the aliphatic and/or aromatic rings of the ring system may also contain one or more heteroatoms, such as nitrogen, oxygen, phosphorus or sulfur. Any of the aliphatic and/or aromatic rings of the ring system may be substituted by one or more groups such as alkyl, substituted alkyl, cycloalkyl, substituted cycloalkyl, heterocycloalkyl, substituted heterocycloalkyl, halogen, alkylhalogen, such as hydroxyl-, phosphino-, alkoxy-, aryloxy-, amino-, thio- and both saturated and unsaturated cyclic hydrocarbons. For the aromatic or aliphatic rings of the ring system, the above-provided definitions for "aryl" and "alkyl" regarding the number of carbon atoms apply as well. A ring system in the context of the present invention contains at least two rings. A "ring carbon atom" is a carbon atom that is part of a cyclic ring structure. By this definition, a benzyl group has six ring carbon atoms and para-methylstyrene also has six ring carbon atoms.

The term "amino" is used herein to refer to the group —$NQ^1Q^2$, where each of $Q^1$ and $Q^2$ is independently selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

DETAILED DESCRIPTION

This invention relates to new catalyst systems comprising a transition metal compound and an activator of formula (1). In another aspect, the present invention also relates to a process of polymerizing one or more olefin monomers using a catalyst system comprising a transition metal compound and an activator of formula (1) or (2). In another aspect, the present invention relates to polymer compositions obtained from the catalysts systems and processes set forth herein. The components of the catalyst systems according to the present invention and used in the polymerization process of the present invention, as well as the resulting polymers, are described in more detail herein below.

Activators and Activation Methods for Catalyst Compounds

The transition metal compounds are activated to yield the catalytically active, cationic transition metal compound having a vacant coordination site to which a monomer will coordinate and then be inserted into the growing polymer chain. In the process for polymerizing olefins according to the present invention, an activator of the following general formulae (1) or (2) is used to activate the transition metal compound:

Formula (1) is: $[R^1R^2R^3AH]^+[Y]^-$     (1)

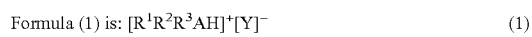

wherein $[Y]^-$ is a non-coordinating anion (NCA) as further illustrated below,

A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system.

Formula (2) is: $[R_nAH]^+[Y]^-$     (2)

wherein $[Y]^-$ is a non-coordinating anion (NCA) as further illustrated below,

A is nitrogen, phosphorus or oxygen, n is 3 if A is nitrogen or phosphorus, and n is 2 if A is oxygen, and the groups R are identical or different and are a $C_1$ to $C_3$ alkyl group.

The present invention thus specifically relates to the new catalyst system itself, comprising a transition metal compound and an activator of the formula (1) shown above, to the use of an activator of said formula (1) for activating a transition metal compound in a catalyst system for polymerizing olefins, and to a process for polymerizing olefins the process comprising contacting under polymerization conditions one or more olefins with a catalyst system comprising a transition metal compound and an activator of formula (1).

The present invention also relates to a process for polymerizing olefins, the process comprising contacting, under polymerization conditions, one or more olefins with a catalyst system comprising a transition metal compound and an activator of formula (2) as shown above. In this process, the weight average molecular weight of the polymer formed increases with increasing monomer conversion at a given reaction temperature.

Both the cation part of formulae (1) and (2) as well as the anion part thereof, which is an NCA, will be further illustrated below. Any combinations of cations and NCAs disclosed herein are suitable to be used in the processes of the present invention and are thus incorporated herein.

Activators—The Cations

The cation component of the activator of formulae (1) or (2) above is usually a protonated Lewis base capable of protonating a moiety, such as an alkyl or aryl, from the transition metal compound. Thus, upon release of a neutral leaving group (e.g. an alkane resulting from the combination of a proton donated from the cationic component of the activator and an alkyl substituent of the transition metal compound) a transition metal cation results, which is the catalytically active species.

In the polymerization process of the present invention an activator of above-depicted formula (2) may be used, wherein the cationic component has the formula $[R_nAH]^+$, wherein:

A is nitrogen, phosphorus or oxygen, n is 3 if A is nitrogen or phosphorus, and n is 2 if A is oxygen, and the groups R are identical or different and are a $C_1$ to $C_3$ alkyl group. $[R_nAH]^+$ may thus be an ammonium, phosphonium or oxonium component, as A may be nitrogen, phosphorus or oxygen.

In one preferred embodiment of formula $[R_nAH]^+$, A is nitrogen or phosphorus, and thus n is 3, and the groups R are identical. More preferably, n is 3, and the groups R are all identically methyl, ethyl or propyl groups, more preferably $[R_nAH]^+$ is trimethylammonium or -phosphonium, triethylammonium or -phosphonium, tri(iso-propyl)ammonium or -phosphonium, tri(n-propyl)ammonium or -phosphonium. Trimethylammonium is particularly preferred. If $[R_nAH]^+$ is an oxonium compound (with n being 2), it is preferably the oxonium derivative of dimethyl ether, diethyl ether, tetrahydrofurane and dioxane.

In another embodiment, an activator of above-depicted formula (1) is used in the polymerization process of the present invention, the cationic component of which has the formula $[R^1R^2R^3AH]^+$, wherein A is nitrogen or phosphorus, $R^1$ and $R^2$ are hydrocarbyl groups or heteroatom-containing hydrocarbyl groups and together form a first, 3- to 10-membered non-aromatic ring with A, wherein any number, preferably two, three, four or five, more preferably two, of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may independently be substituted by one or more substituents selected from the group consisting of a hydrogen atom, halogen atom, $C_1$ to $C_{10}$ alkyl, preferably $C_1$ to $C_5$ alkyl, $C_5$ to $C_{15}$ aryl, preferably $C_5$ to $C_{10}$ aryl, $C_6$ to $C_{25}$ arylalkyl, and $C_6$ to $C_{25}$ alkylaryl, and $R^3$ is a hydrogen atom or $C_1$ to $C_{10}$ alkyl or a $C_1$ to $C_{10}$ alkylene group that connects to said first ring and/or said at least second ring or ring system. Since $R^1$ and $R^2$ may also be heteroatom (e.g. nitrogen, phosphorus or oxygen)-containing hydrocarbyl groups, the 3- to 10-membered ring they are forming with A and/or the at least one second ring or ring system may contain one or more additional heteroatoms (in addition to A), such as nitrogen and/or oxygen. Nitrogen is a preferred additional heteroatom that may be contained once or several times in said first ring and/or said at least one second ring or ring system. Any additional heteroatom, preferably nitrogen, may preferably be substituted independently by a hydrogen atom, or $C_1$ to $C_5$ alkyl.

One preferred embodiment of the cation in formula (1) is depicted in the following formula (1)':

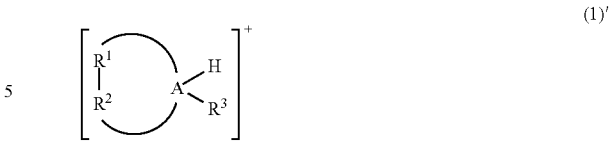

In formula (1)' $R^1$ and $R^2$ together are a $—(CH_2)_a—$ (i.e., alkylene) group with a being 3, 4, 5 or 6, and A is preferably nitrogen, $R^3$ is a hydrogen atom or $C_1$ to $C_{10}$ alkyl, or $R^3$ is a $C_1$ to $C_{10}$ alkylene group that connects to the ring formed by A, $R^1$, and $R^2$. In a specific embodiment, $R^3$ is an alkylene group with 1, 2 or 3 carbon atoms which is connected to the ring formed by $R^1$, $R^2$ and A. $R^1$, $R^2$ and/or $R^3$ may also be aza- or oxa-alkylene groups. $R^1$ and $R^2$ preferably form a 4-, 5-, 6- or 7-membered, non-aromatic ring with the nitrogen atom A.

Preferably, A in formula (1) or (1)' is nitrogen, and $R^1$ and $R^2$ together are a $—(CH_2)_a—$ group (also referred to as "alkylene" group) with a being 3, 4, 5 or 6, or $R^1$ and $R^2$ may also be aza- or oxa-alkylene groups as mentioned above. $R^1$ and $R^2$ preferably form a 4, 5-, 6- or 7-membered, non-aromatic ring with the nitrogen atom A. Non-limiting examples of such ring are piperidinium, pyrrolidinium, piperazinium, indolinium, isoindolinium, imidazolidinium, morpholinium, pyrazolinium etc. The additional substituent at A, $R^3$, is in any of these cases preferably $C_1$ to $C_5$ alkyl, more preferably $C_1$ to $C_4$ alkyl, even more preferably $C_1$ to $C_3$ alkyl, and more preferably methyl or ethyl. $R_3$ may also be a $C_1$ to $C_5$ alkylene group, preferably a $C_1$ to $C_4$ alkylene group, more preferably a $C_1$ to $C_3$ alkylene group and more preferably a $—(CH_2)_3—$, $—(CH_2)_2—$ or $—CH_2—$ group that connects to the first ring containing $R^1$, $R^2$ and A and/or the at least second ring or ring system fused to the first ring. Thus, $[R^1R^2R^3AH]^+$ can also form a tricyclic structure, for example but not limited to the following ones (which may be further substituted in one or more positions by any substituents mentioned above and may contain unsaturations, but are preferably not aromatic):

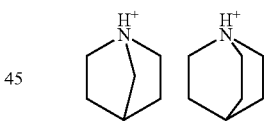

If additional heteroatoms are present in the first ring and/or the at least one second ring or ring system, structures like the following, nonlimiting example (which, again, may be further substituted by one or more substituents as mentioned above and may contain unsaturations, but are preferably not aromatic) may be used as the cation:

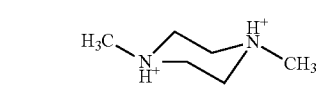

In another preferred embodiment the ring formed by $R^1$, $R^2$ and A is fused to at least one other aliphatic or aromatic ring or ring system. For example, in the case that $R^1$, $R^2$ and A form a 5- or 6-membered aliphatic first ring with the heteroatom being phosphorus or nitrogen, one or more 5- or 6-membered aromatic rings or ring systems may be fused to said first ring via adjacent carbon atoms of the first ring.

In a preferred embodiment, [R¹R²R³AH]⁺ is N-methylpyrrolidinium, N-methylpiperidinium, N-methyldihydroindolinium or N-methyldihydroisoindolinium.

In another preferred embodiment the cation in formula (1) is depicted as one of the following four formulae (which are based upon formula (1) and are included when formula (1) is referred to herein.)

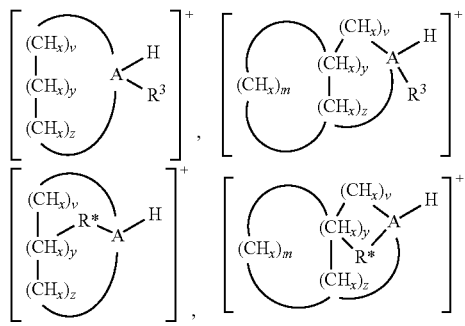

wherein each x is 0, 1 or 2, y is 3, 4, 5, 6, 7, 8, 9, or 10, (preferably 3, 4, 5, or 6), v is 1, 2, 3, 4, 5, 6, or 7 (preferably 0, 1, 2 or 3), z is 1, 2, 3, 4, 5, 6, or 7 (preferably 0, 1, 2 or 3), and v+y+z=3, 4, 5, 6, 7, 8, 9, or 10 (preferably v+y+z=3, 4, 5 or 6), m is 1, 2, 3, 4, 5, 6, 7, 8, 9 or 10 (preferably 1, 2, 3, or 4), A is nitrogen or phosphorus (preferably nitrogen), R³ is a hydrogen atom or $C_1$ to $C_{10}$ alkyl, R* is a $C_1$ to $C_{10}$ alkyl, where any of the $(CH_x)$ groups may be substituted, independently, by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. In another embodiment, at least one of the $(CH_x)$ groups is replaced by a heteroatom, preferably nitrogen. In a preferred embodiment, the rings depicted in the formulae above are saturated or partially unsaturated, but are preferably not aromatic. Alternately, the ring containing $(CH_x)_v$, $(CH_x)_y$, and $(CH_x)_z$ is not aromatic, while the ring containing $(CH_x)_m$ may or may not be aromatic.

The cationic component of the activator, when contacted with the transition metal compound, will donate its proton and thus become a neutral Lewis base (donor) compound. The neutral Lewis bases originating from the cationic components $[R_nAH]^+$ and $[R^1R^2R^3AH]^+$ described hereinabove coordinate (but not irreversibly as they can still be displaced by the olefin monomer) to the transition metal. Without wishing to be bound by this theory, it is believed that a balance between strongly coordinating and non-coordinating Lewis bases has to be found in order to achieve the technical effects of the present invention, inter alia, to be able to homo- or co-polymerize olefins with high catalytic activity (productivity), and/or wherein at a given reaction temperature the Mw of the polymer formed increases with increasing monomer conversion and/or wherein the resulting polymers have high Mw and/or high melting points as described in more detail below.

The effect that the Mw of the polymer formed increases with monomer conversion at a given reaction temperature is illustrated in FIG. 1. With the catalyst systems comprising a transition metal compound and an activator of formula (1) or (2), the slope of Mw versus monomer conversion is positive or at least even, whereas with comparative catalyst systems comprising an activator that is not according to formula (1) or (2), usually a negative slope of Mw versus conversion is observed.

Figure 2A:
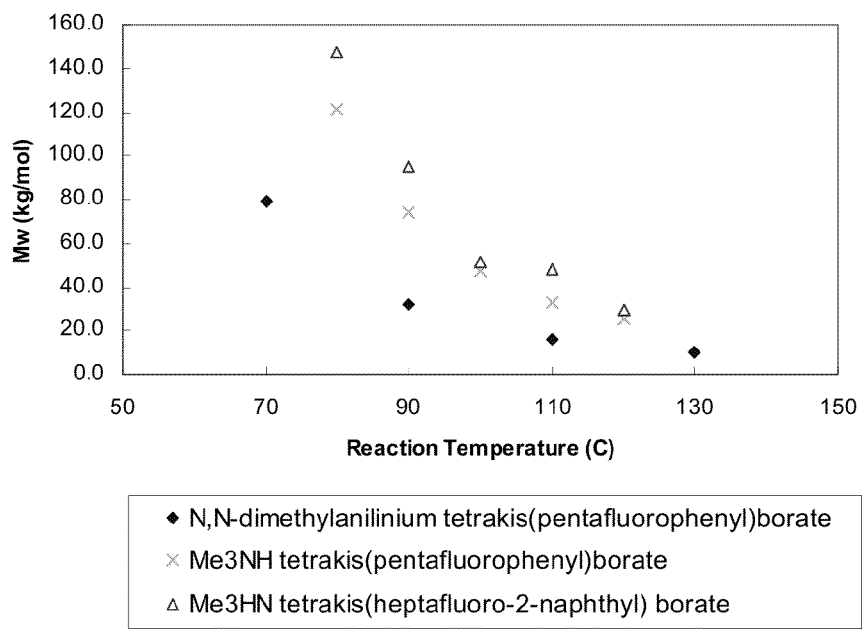
FIG. 2a shows Mw versus reaction temperature (° C.) of the resulting polymer in a propylene polymerization reaction with rac-dimethylsilylbis(indenyl)hafnium dimethyl, tetrakis (pentafluorophenyl)borate and tetrakis(heptafluoronaphthyl) borate and two different counter-cations, trimethylammonium (according to the present invention) and dimethylanilinium (comparative), see Example 2.
Figure 2B:
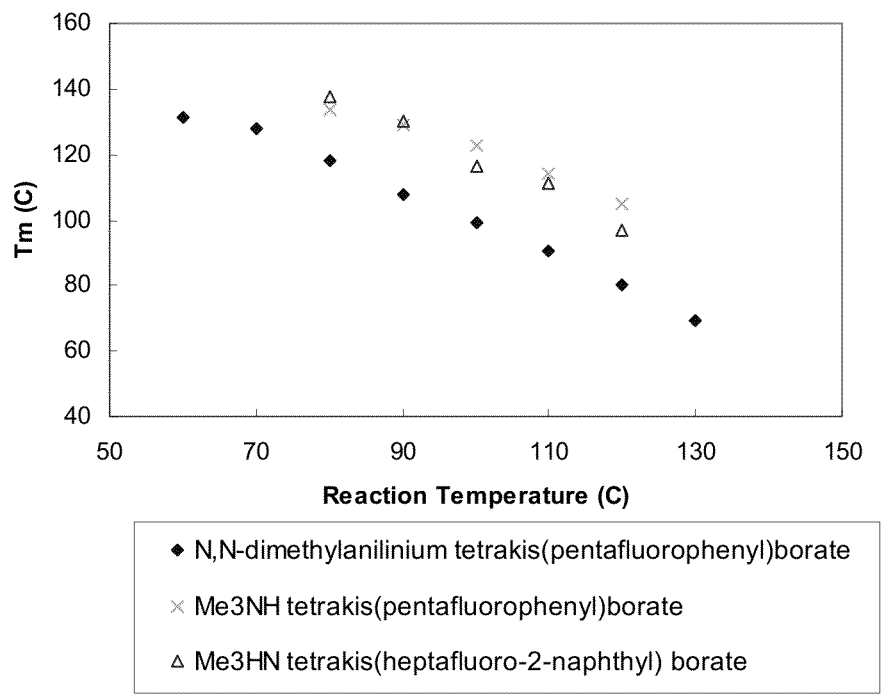
FIG. 2b shows melting point (° C.) of the resulting polymer versus reaction temperature (° C.) in a propylene polymerization reaction with rac-dimethylsilylbis(indenyl)hafnium dimethyl, tetrakis(pentafluorophenyl)borate and tetrakis (heptafluoronaphthyl)borate and two different counter-cations, trimethylammonium (according to the present invention) and dimethylanilinium (comparative), see also Example 2.
Figure 3A:
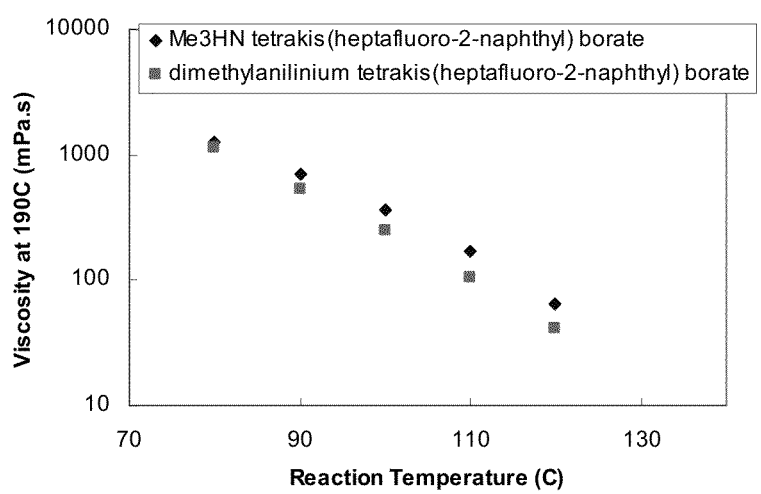
FIG. 3a shows the viscosity of the resulting polymer measured at 190° C. versus reaction temperature (° C.) in a propylene polymerization reaction with rac-dimethylsilylbis(indenyl)zirconium dimethyl, tetrakis(heptafluoronaphthyl) borate and two different counter-cations, trimethylammonium (according to the present invention) and dimethylanilinium (comparative), see also Example 3.
Figure 3B:
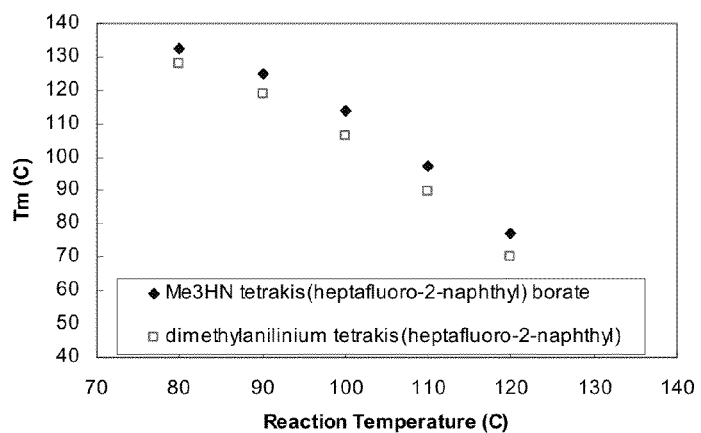
FIG. 3b shows melting point (° C.) of the resulting polymer versus reaction temperature (° C.) in a propylene polymerization reaction with rac-dimethylsilylbis(indenyl)zirconium dimethyl, tetrakis(heptafluoronaphthyl)borate and two different counter-cations, trimethylammonium (according to the present invention) and dimethylanilinium (comparative), see also Example 3.

The effect that with the present invention using activators of formula (1) or (2), preferably formula (1), in catalyst systems comprising a transition metal compound as described herein polyolefins, preferably polypropylene, with higher Mw and at the same time higher melting point are obtained than with comparative catalyst systems containing conventional activators, is illustrated in FIGS. 2a and 2b as well as in FIGS. 3a and 3b.

Figure 4:
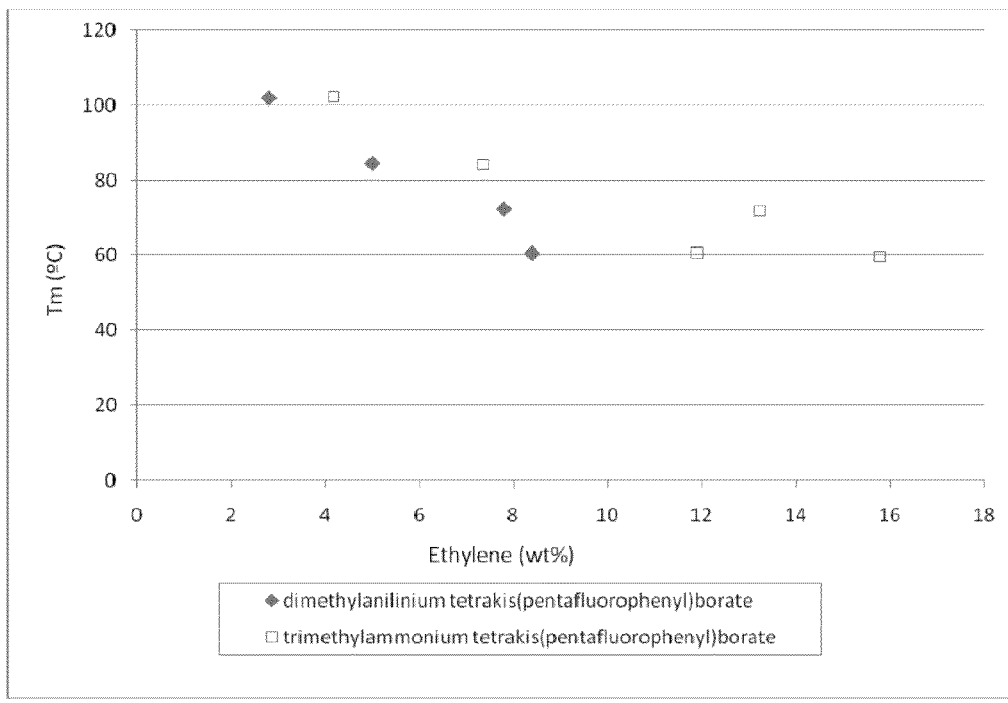
FIG. 4 shows melting point (° C.) of the resulting polymer versus ethylene content in a propylene polymerization reaction with rac-dimethylsilylbis(indenyl)hafnium dimethyl, tetrakis(pentafluorophenyl)borate and two different counter-cations, trimethylammonium (according to the present invention) and dimethylanilinium (comparative).
Figure 5:
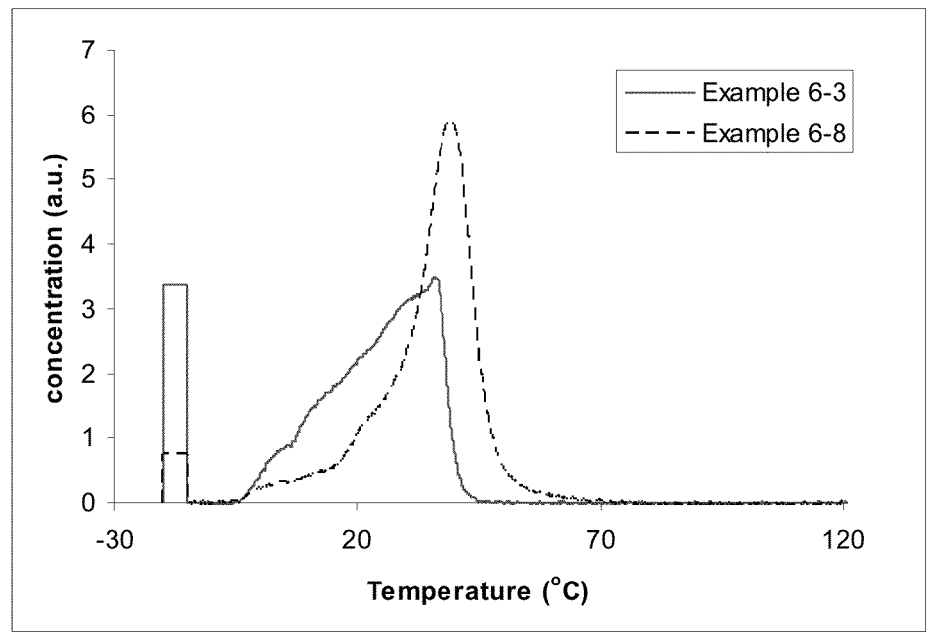
FIG. 5 shows Temperature Rising Elution Fractionation (TREF) results for an inventive polymer versus a comparative polymer.

FIGS. 4 and 5, on the other hand, illustrate that using activators of formula (2) in catalyst systems comprising a transition metal compound as described herein to form polyolefins, preferable propylene-ethylene copolymers, results in polymers having higher melting temperatures and narrower composition distributions than polymers with comparable comonomer content that are prepared using previously known catalyst systems.

Finally, an activator in the processes of the present invention may also be a combination of at least two different activators of formula (1) and/or (2). For example two different ammonium components may be used at the same time with the same or different NCA's. Using two different cationic compounds in the activators according to formula (1) and/or (2) can result in broadened MWDs and a broader range of melting points in the resulting polyolefins and can thus be used to tailor polymer properties. For example, N-methylpyrrolidinium and trimethylammonium may be used in combination together with the same NCA as defined below, particularly those such as tetrakis(pentafluorophenyl)borate and tetrakis(heptafluoronaphthyl)borate. Furthermore, in order to obtain the same effect as a mixture of cationic components, an activator with one cationic component may be used, while a second Lewis base may be added as a free base.

The Non-Coordinating Anion (NCA)

In the catalyst systems and the polymerization processes of the present invention [Y]⁻ in formulae (1) and (2) is a non-coordinating anion (NCA). The term "non-coordinating anion" means an anion that does not coordinate to the metal cation of the catalyst or that does coordinate to the metal cation, but only weakly. NCA's are usually relatively large (bulky) and capable of stabilizing the active catalyst species which is formed when the compound and the activator are combined. Said anion must still be sufficiently labile to be displaced by unsaturated monomers. Further, the anion will not transfer an anionic substituent or fragment to the cation of the transition metal compound as to cause it to form a neutral transition metal compound and a neutral by-product from the anion. Thus, suitable NCAs are those which are not degraded to neutrality when the initially formed complex decomposes. Two classes of compatible NCAs useful herein have been disclosed e.g. in EP-A-0 277 003 and EP-A-0 277 004. They include: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

The anion component [Y]⁻ includes those having the formula $[M^{k+}Q_n]^{d-}$ wherein k is an integer from 1 to 3; n is an integer from 2 to 6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radical, said Q having up to 20 carbon atoms with the proviso that in not more than one occurrence is Q a halide (but more than one q may be a halide containing group). Preferably, each Q is a fluorinated hydrocarbyl having 1 to 20 carbon atoms, more preferably each Q is a fluorinated aryl group, and more preferably each Q is a perfluorinated aryl group. Examples of suitable [Y]⁻ also include diboron compounds as those disclosed in U.S. Pat. No. 5,447,895.

[Y]⁻ is preferably [B(R$^4$)$_4$]⁻, with R$^4$ being an aryl group or a substituted aryl group, of which the one or more substituents are identical or different and are selected from the group consisting of alkyl, aryl, a halogen atom, halogenated aryl, and haloalkylaryl groups. Preferred examples of [Y]⁻ for use in the present invention are: tetraphenylborate, tetrakis(pentafluorophenyl)borate, tetrakis-(2,3,4,6-tetrafluorophenyl)borate, tetrakis-(perfluoronaphthyl)borate (also referred to as tetrakis(heptafluoronaphthyl)borate), tetrakis(perfluorobiphenyl)borate, and tetrakis(3,5-bis(trifluoromethyl)phenyl)borate. Particularly preferred [Y]⁻ are tetrakis(pentafluorophenyl)borate and tetrakis(heptafluoronaphthyl)borate.

Any of the NCA's [Y]⁻ illustrated herein can be used in combination with any cation component of the activator of formula (1) or (2) as defined hereinabove. Thus, any combination of preferred components [Y]⁻ and preferred components [R$^1$R$^2$R$^3$AH]⁺ or [R$_n$AH]⁺ are considered to be disclosed and suitable in the processes of the present invention.

Preferred Activators

Preferred activators of formula (1) in the catalyst systems of the present invention and used in the polymerization processes of the present invention are those wherein A is nitrogen, R$^1$ and R$^2$ together are a —(CH$_2$)$_a$— group with a being 3, 4, 5, or 6, and R$^3$ is C$_1$, C$_2$, C$_3$, C$_4$ or C$_5$ alkyl, and [Y]⁻ is [B(R$^4$)$_4$]⁻, with R$^4$ being an aryl group or a substituted aryl group, of which the one or more substituents are identical or different and are selected from the group consisting of alkyl, aryl, a halogen atom, halogenated aryl, and haloalkylaryl groups, and preferably R$^4$ is a perhalogenated aryl group, more preferably a perfluorinated aryl group, more preferably pentafluorophenyl, heptafluoronaphthyl or perfluorobiphenyl. Preferably, these activators are combined with transition metal compound (such as a metallocene) to form the catalyst systems of the present invention.

Preferred activators in the catalyst systems of formula (2) in the catalyst systems used in the polymerization processes of the present invention are those wherein A is nitrogen, n is 3, all groups R are identical and are methyl, ethyl or isopropyl, and [Y]⁻ is [B(R$^4$)$_4$]⁻, with R$^4$ being an aryl group or a substituted aryl group, of which the one or more substituents are identical or different and are selected from the group consisting of alkyl, aryl, a halogen atom, halogenated aryl, and haloalkylaryl groups, and preferably R$^4$ is a perhalogenated aryl group, more preferably a perfluorinated aryl group, more preferably pentafluorophenyl, heptafluoronaphthyl or perfluorobiphenyl. Preferably, these activators are combined with a transition metal compound (such as a metallocene) to form the catalyst systems of the present invention.

In the polymerization process of the present invention, in addition to the preferred activators of formula (1) mentioned in the preceding paragraph also the activators of formula (2) wherein A is nitrogen and all groups R are identically methyl or ethyl, and wherein [Y]⁻ is defined as in the preceding paragraph are preferably used. Again, these activators are preferably combined with a metallocene (e.g. as explained herein below) to form the catalyst systems used in the polymerization process of the present invention.

Transition Metal Compounds

Any transition metal compound capable of catalyzing a reaction such as a polymerization reaction, upon activation of an activator as described above is suitable for use in the present invention. Transition metal compounds known as metallocenes are preferred compounds according to the present invention.

Metallocenes

The metallocene compounds (also referred to as metallocenes, metallocene catalyst precursors, or catalyst precursors) useful herein are generally known in the art, and are preferably cyclopentadienyl derivatives of titanium, zirconium and hafnium. Useful metallocenes (e.g. titanocenes, zirconocenes and hafnocenes) may be represented by the following formulae:

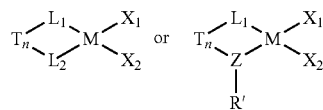

wherein M is the metal center, and is a Group 4 metal, preferably titanium, zirconium or hafnium, preferably zirconium or hafnium when L$_1$ and L$_2$ are present and preferably titanium when Z is present; n is 0 or 1;

T is an optional bridging group which, if present, in preferred embodiments is selected from dialkylsilyl, diarylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently C$_1$ to C$_{16}$ alkyl or phenyl, tolyl, xylyl and the like, and when T is present, the catalyst represented can be in a racemic or a meso form;

L$_1$ and L$_2$ are the same or different cyclopentadienyl, indenyl, tetrahydroindenyl or fluorenyl rings, optionally substituted, that are each bonded to M, or L$_1$ and L$_2$ are the same or different cyclopentadienyl, indenyl, tetrahydroindenyl or fluorenyl, which are optionally substituted, in which any two adjacent R groups on these rings are optionally joined to form a substituted or unsubstituted, saturated, partially unsaturated, or aromatic cyclic or polycyclic substituent;

Z is nitrogen, oxygen or phosphorus (preferably nitrogen); R' is a cyclic linear or branched C$_1$ to C$^{40}$ alkyl or substituted alkyl group (preferably Z—R' form a cyclododecylamido group);

X$_1$ and X$_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

By use of the term hafnocene is meant a bridged or unbridged, bis- or mono-cyclopentadienyl (Cp) hafnium complex having at least two leaving groups X$_1$ and X$_2$, which are as defined immediately above and where the Cp groups may be substituted or unsubstituted cyclopentadiene, indene or fluorene. By use of the term zirconocene is meant a bridged or unbridged, bis- or mono-cyclopentadienyl (Cp) zirconium complex having at least two leaving groups X$_1$ and X$_2$, which are as defined immediately above and where the Cp groups may be substituted or unsubstituted cyclopentadiene, indene or fluorene. By use of the term titanocene is meant a bridged or unbridged, bis- or mono-cyclopentadienyl (Cp) titanium complex having at least two leaving groups X$_1$ and X$_2$, which are as defined immediately above and where the Cp groups may be substituted or unsubstituted cyclopentadiene, indene or fluorene.

Among the metallocene compounds which can be used in this invention are stereorigid, chiral or asymmetric, bridged or non-bridged, or so-called "constrained geometry" metallocenes. See, for example, U.S. Pat. No. 4,892,851; U.S. Pat. No. 5,017,714; U.S. Pat. No. 5,132,281; U.S. Pat. No. 5,155,080; U.S. Pat. No. 5,296,434; U.S. Pat. No. 5,278,264; U.S. Pat. No. 5,318,935; U.S. Pat. No. 5,969,070; U.S. Pat. No. 6,376,409; U.S. Pat. No. 6,380,120; U.S. Pat. No. 6,376,412; WO-A-(PCT/US92/10066); WO 99/07788; WO-A-93/19103; WO 01/48034; EP-A2-0 577 581; EP-A1-0 578 838; WO 99/29743 and also the academic literature, see e.g. "The Influence of Aromatic Substituents on the Polymerization Behavior of Bridged Zirconocene Catalysts", Spaleck, W., et al, Organometallics 1994, 13, 954-963, and "ansa-Zirconocene Polymerization Catalysts with Annelated Ring Ligands-Effects on Catalytic Activity and Polymer Chain Lengths", Brintzinger, H., et al, Organometallics 1994, 13, 964-970, and documents referred to therein. The bridged metallocenes disclosed in WO 99/07788 and the unbridged metallocenes disclosed in U.S. Pat. No. 5,969,070 are particularly suitable for the present invention.

Preferably, the transition metal compound is a dimethylsilylbis(indenyl) metallocene, wherein the metal is a Group 4 metal, specifically, titanium, zirconium, or hafnium, and the indenyl may be substituted by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. More preferably, the metal is zirconium or hafnium, $L_1$ and $L_2$ are unsubstituted or substituted indenyl radicals, T is dialkylsiladiyl, and $X_1$ and $X_2$ are both halogen or $C_1$ to $C_3$ alkyl. Preferably, these compounds are in the rac-form.

Illustrative, but not limiting examples of preferred stereospecific metallocene compounds are the racemic isomers of dimethylsilylbis(indenyl) metal dichloride, -diethyl or -dimethyl, wherein the metal is titanium, zirconium or hafnium, preferably hafnium or zirconium. It is particularly preferred that the indenyl radicals are not substituted by any further substituents. However, in certain embodiments the two indenyl groups may also be replaced, independently of each other, by 2-methyl-4-phenylindenyl; 2-methyl indenyl; 2-methyl,4-[3',5'-di-t-butylphenyl]indenyl; 2-ethyl-4-[3',5'-di-t-butylphenyl]indenyl; 2-n-propyl-4-[3',5'-di-t-butylphenyl]indenyl; 2-iso-propyl-4-[3',5'-di-t-butylphenyl]indenyl; 2-iso-butyl-4-[3',5'-di-t-butylphenyl]indenyl; 2-n-butyl-4-[3',5'-di-t-butylphenyl]indenyl; 2-sec-butyl-4-[3',5'-di-t-butylphenyl]indenyl; 2-methyl-4-[3',5'-di-phenylphenyl]indenyl; 2-ethyl-4-[3',5'-di-phenylphenyl]indenyl; 2-n-propyl-4-[3',5'-di-phenylphenyl]indenyl; 2-iso-propyl-4-[3',5'-di-phenylphenyl]indenyl; 2-n-butyl-4-[3',5'-di-phenylphenyl]indenyl; 2-sec-butyl-4-[3',5'-di-phenylphenyl]indenyl; 2-tert-butyl-4-[3',5'-di-phenylphenyl]indenyl; and the like. Further illustrative, but not limiting examples of preferred stereospecific metallocene compounds are the racemic isomers of 9-silafluorenylbis(indenyl) metal dichloride, -diethyl or -dimethyl, wherein the metal is titanium, zirconium or hafnium. Again, unsubstituted indenyl radicals are particularly preferred. In some embodiments, however the two indenyl groups may be replaced, independently of each other, by any of the substituted indenyl radicals listed above.

Particularly preferred metallocenes as transition metal compounds for use in the catalyst systems of the present invention together with the activators of formula (1) or (2) defined above for use in polymerizing olefins are rac-dimethylsilylbis(indenyl)hafnocenes or -zirconocenes, rac-dimethylsilylbis(2-methyl-4-phenylindenyl)hafnocenes or -zirconocenes, rac-dimethylsilylbis(2-methyl-indenyl) hafnocenes or -zirconocenes, and rac-dimethylsilylbis(2-methyl-4-naphthylindenyl)hafnocenes or -zirconocenes, wherein the hafnium and zirconium metal is substituted, in addition to the bridged bis(indenyl) substituent, by two further substituents, which are halogen, preferably chlorine or bromine atoms, or alkyl groups, preferably methyl and/or ethyl groups. Preferably, these additional substituents are both chlorine atoms or both methyl groups. Particularly preferred transition metal compounds are dimethylsilylbis(indenyl)hafnium dimethyl, rac-dimethylsilylbis(indenyl)zirconium dimethyl, rac-ethylenylbis(indenyl)zirconium dimethyl, and rac-ethylenylbis(indenyl)hafnium dimethyl.

Illustrative, but not limiting examples of preferred non-stereospecific metallocene catalysts are: [dimethylsilanediyl (tetramethylcyclopentadienyl)-(cyclododecylamido)]metal dihalide, [dimethylsilanediyl(tetramethylcyclopentadienyl)(t-butylamido)]metal dihalide, [dimethylsilanediyl(tetramethylcyclopentadienyl)(exo-2-norbornyl)]metal dihalide, wherein the metal is Zr, Hf, or Ti, preferably Ti, and the halide is preferably chlorine or bromine.

In a preferred embodiment, the transition metal compound is a bridged or unbridged bis(substituted or unsubstituted indenyl) hafnium dialkyl or dihalide.

Finally, also non-metallocene compounds that are active in catalyzing olefin polymerization reactions are suitable as the transition metal compound in the catalyst systems and the processes of the present invention. A particularly preferred species of non-metallocene catalysts are the pyridyl amines disclosed e.g. in WO 03/040201.

Preferred Catalyst Systems

Preferred combinations of transition metal compound and activator in the catalyst systems for olefin polymerization according to the present invention comprise the following components:

a metallocene compound, preferably a dialkylsilyl-bridged bis(indenyl)metallocene, wherein the metal is a group 4 metal and the indenyl is unsubstituted, or if substituted, is substituted by one or more substituents selected from the group consisting of a $C_1$ to $C_{10}$ alkyl, $C_5$ to $C_{15}$ aryl, $C_6$ to $C_{25}$ arylalkyl, and $C_6$ to $C_{25}$ alkylaryl; more preferably dimethylsilylbis(indenyl) metal dichloride or -dimethyl, ethylenylbis(indenyl) metal dichloride or -dimethyl, dimethylsilylbis(2-methyl-4-phenylindenyl) metal dichloride or -dimethyl, dimethylsilylbis(2-methyl-indenyl) metal dichloride or -dimethyl, and dimethylsilylbis(2-methyl-4-naphthylindenyl) metal dichloride or -dimethyl, wherein in all cases the metal may be zirconium or hafnium, a cationic component $[R^1R^2R^3AH]^+$ wherein preferably A is nitrogen, $R^1$ and $R^2$ are together an —$(CH_2)_a$— group, wherein a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, more preferably N-methylpyrrolidinium or N-methylpiperidinium; or a cationic component $[R_nAH]^+$ wherein preferably A is nitrogen, n is 3 and all R are identical and are $C_1$ to $C_3$ alkyl groups, more preferably trimethylammonium or triethylammonium; and an anionic component $[Y]^-$ which is an NCA, preferably of the formula $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, preferably perhalogenated aryl groups, more preferably perfluorinated aryl groups, and more preferably pentafluorophenyl, heptafluoronaphthyl or perfluorobiphenyl.

More preferably, the activator for use in any of the polymerization processes according to the present invention is trimethylammonium tetrakis(pentafluorophenyl)borate, N-methylpyrrolidinium tetrakis(pentafluorophenyl)borate, trimethylammonium tetrakis(heptafluoronaphthyl)borate, or N-methylpyrrolidinium tetrakis(heptafluoronaphthyl)borate. The metallocene is preferably rac-dimethylsilyl bis(indenyl) zirconium dichloride or -dimethyl, rac-dimethylsilyl bis(indenyl)hafnium dichloride or -dimethyl, rac-ethylenyl bis(indenyl)zirconium dichloride or -dimethyl or rac-ethylenyl bis(indenyl)hafnium dichloride or -dimethyl.

In another embodiment, a preferred transition metal compound comprises a bis indenyl compound represented by the formula:

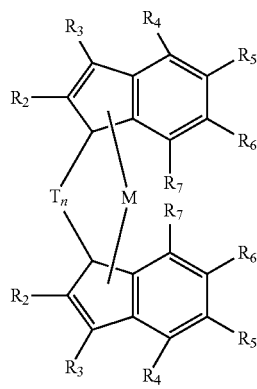

wherein M is a group 4 metal, preferably hafnium, T is a bridging group (such as an alkylene (methylene, ethylene) or a di substituted silyl or germyl group, (such as dimethyl silyl)), n is 0 or 1, $R_2$, $R_3$, $R_4$, $R_5$, $R_6$, and $R_7$ are hydrogen, a heteroatom, a substituted heteroatom group, a substituted or unsubstituted alkyl group, and a substituted or unsubstituted aryl group (preferably a substituted or unsubstituted alkyl or a substituted or unsubstituted aryl group). In a preferred embodiment $R_2$ is hydrogen. In another preferred embodiment $R_2$ and $R_4$ are hydrogen. In another preferred embodiment $R_2$ is hydrogen and $R_4$ is $C_1$ to $C_{20}$ alkyl (preferably methyl) or an aryl group (such as substituted or unsubstituted phenyl). In another preferred embodiment $R_2$ and $R_4$ are methyl. In another embodiment $R_2$ and $R_4$ are not methyl. In another embodiment $R_2$ is not methyl. In another preferred embodiment, $R_3$, $R_4$, $R_5$, $R_6$, and $R_7$ are hydrogen and $R_2$ is substituted or unsubstituted alkyl or substituted or unsubstituted aryl (preferably methyl). In another preferred embodiment, $R_2$, $R_3$, $R_5$, $R_6$, and $R_7$ are hydrogen and $R_4$ is substituted or unsubstituted alkyl or substituted or unsubstituted aryl (preferably methyl or phenyl).

Any catalyst system resulting from any combination of the preferred metallocene compound, preferred cationic component of the activator and preferred anionic component of the activator mentioned in the preceding paragraph shall be explicitly disclosed and may be used in accordance with the present invention in the polymerization of one or more olefin monomers. Also, combinations of two different activators can be used with the same or different metallocene(s).

Scavengers or Additional Activators

The catalyst systems suitable for all aspects of the present invention may contain, in addition to the transition metal compound and the activator described above, also additional (additional activators or scavengers) as explained in the following.

A co-activator is a compound capable of alkylating the transition metal complex, such that when used in combination with an activator, an active catalyst is formed. Co-activators include alumoxanes as mentioned in the following, and aluminum alkyls as further listed below. An alumoxane is preferably an oligomeric aluminum compound represented by the general formula $(R^x-Al-O)_n$, which is a cyclic compound, or $R^x(R^x-Al-O)_n AlR^x{}_2$, which is a linear compound. Most common alumoxane is a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. More preferably, $R^x$ is methyl and "n" is at least 4. Methyl alumoxane (MAO) as well as modified MAO, referred to herein as MMAO, containing some higher alkyl groups to improve the solubility, ethyl alumoxane, iso-butyl alumoxane and the like are useful herein. Particularly useful MAO can be purchased from Albemarle in a 10 wt % solution in toluene. Co-activators are typically only used in combination with Lewis acid activators and ionic activators when the pre-catalyst is not a dihydrocarbyl or dihydride complex.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. More preferred aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Preferred boron alkyls include triethylboron. Scavenging compounds may also be alumoxanes and modified alumoxanes including methylalumoxane and modified methylalumoxane.

Method of Preparing Catalyst System

The catalyst systems of the present invention can be prepared according to methods known in the art. For obtaining the cations of the activators of formula (1) or (2) as defined hereinabove, for example ammonium cations can be provided as salts that can be synthesized by the reaction of an amine with an acid in which the conjugate base of the acid remains as the counteranion or is exchanged with other anions. See "Organic Chemistry", Pine et al. 4$^{th}$ edition, McGraw-Hill, 1980. A useful synthesis for example is the reaction of a slight excess of HCl (as an $Et_2O$ solution) with the amine in hexanes resulting in the immediate precipitation of the amine hydrochloride. The chloride can be replaced by anion exchange with a suitable NCA according to the present invention. See references Chemische Berichte, 1955, 88, p. 962, or U.S. Pat. No. 5,153,157 and references therein. Phosphines and ethers are similarly protonated with acids and can undergo anion exchange reactions to the desired phosphonium salts, see for example DE 2116439.

Supports

Preferably the catalyst systems of this invention include a support material or carrier. The support material is any of the conventional support materials. Preferably the supported material is a porous support material, for example, talc, and inorganic oxides. Other support materials include zeolites, clays, organoclays, or any other organic or inorganic support material and the like, or mixtures thereof.

Preferred support materials are inorganic oxides that include Group 2, 3, 4, 5, 13 or 14 metal oxides. Preferred supports include silica, which may or may not be dehydrated, fumed silica, alumina (WO 99/60033), silica-alumina and mixtures thereof. Particularly useful supports include magnesia, titania, zirconia, montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like.

It is preferred that the support material, more preferably an inorganic oxide, have a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. More preferably the surface area of the support material is in the range is from about 100 to about 400 $m^2/g$, pore volume from about 0.8 to about 3.0 cc/g and average particle size is from about 5 to about 100 µm. The average pore size of the carrier useful in the invention typically has pore size in the range of from 10 to 1000 Å, preferably 50 to about 500 Å, and more preferably 75 to about 350 Å.

In another embodiment the support may comprise one or more types of support material, which may be treated differently. For example one could use two different silicas that had different pore volumes or had been calcined at different temperatures. Likewise one could use silica that had been treated with a scavenger or other additive and silica that had not.

Preferably the supports have been calcined at temperatures above 500° C., preferably above 550° C., preferably at 600° C. or above, preferably above 650° C., preferably at 700° C. or above, preferably above 750° C., preferably at 800° C. or above.

In an alternate embodiment, the supports have been calcined at temperatures above 200° C., preferably above 300° C., preferably at 400° C. or above.

In another embodiment, the supports have not been calcined.

Method of Supporting Catalyst System

The catalyst systems of the invention are supported on a suitable support as explained hereinabove according to the methods known in the art. Typically a support is first modified with reagents that react with hydroxy groups to render these less reactive with the cationic transition metal complex. Such reagents would include aluminum alkyls such as $AlEt_3$, $Al^iBu_3$, etc. Other reagents would include MMAO, MAO, silanes containing Si—H, chloro-silanes of the general formula $R_xSiCl_y$, Si—OEt compounds, etc. The activator of formula (1) or (2) can then be reacted with the transition metal compound, preferably the metallocene, in a separate step and then supported on the modified support. Also, the transition metal compound, preferably the metallocene, can be supported first on the modified support followed by the activator. Alternatively, the activator is supported first on the modified supported, followed by the transition metal compound (the metallocene).

Monomers

The catalyst systems described herein can be used for the polymerization of one or more olefin monomers. Typical monomers include unsaturated monomers having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega diolefins; and linear, branched or cyclic polyenes. Preferred monomers include one or more of ethylene, propylene, butene-1, pentene-1,4-methyl-pentene-1, hexene-1, octene-1, decene-1,3-methyl-pentene-1, norbornene, norbornadiene, vinyl norbornene, and ethylidene norbornene monomers.

In one embodiment the process of this invention relates to the homopolymerization of ethylene or the copolymerization of ethylene with at least one comonomer having from 3 to 8 carbon atoms, preferably 4 to 7 carbon atoms. Particularly, the comonomers are propylene, butene-1,4-methyl-pentene-1,3-methyl-pentene-1, hexene-1 and octene-1, the more preferred being hexene-1, butene-1 and octene-1. Preferably the comonomer(s) are present in the ethylene copolymer at from about 0.1 to about 50 wt %, or from about 1 to about 30 wt %, or from about 1 to about 20 wt %.

In another, preferred embodiment the process of this invention relates to the homopolymerization of propylene or the copolymerization of propylene. In the case of copolymerization, the comonomer of the copolymer is preferably ethylene and/or a $C_4$ to $C_{20}$ linear, branched or cyclic monomer, and in one embodiment is a $C_4$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The comonomer, preferably ethylene, is present in from about 0.5 to about 40 wt %, or from about 1 to about 35 wt %, or from about 1 to about 30 wt %, or from about 2 to about 25 wt %, or from about 3 to about 18 wt %, or from about 5 to about 15 wt %, based on the entire polymer.

In another embodiment the polymer produced herein is a homopolymer or copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment, the monomer to be polymerized comprises aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also useful monomers herein. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, more preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the ethylene and/or propylene-based polymer produced herein at up to 10 weight %, preferably at 0.00001 to 1.0 weight %, preferably 0.002 to 0.5 weight %, even more preferably 0.003 to 0.2 weight %, based upon the total weight of the polymer. In some embodiments 500 ppm or less of diene is added to the polymerization, preferably 400 ppm or less, preferably or 300 ppm or less, based upon the total weight of the polymer. In other embodiments at least 50 ppm of diene is added to the polymerization, or 100 ppm or more, or 150 ppm or more, based upon the total weight of the polymer.

In another embodiment ethylene and/or propylene is/are polymerized with at least two different comonomers to form a terpolymer. Preferred comonomers include a combination of alpha-olefin monomers having 4 to 10 carbon atoms, more preferably 4 to 8 carbon atoms, optionally with at least one diene monomer. Preferred terpolymers include ethylene/butene-1/hexene-1, ethylene/propylene/butene-1, propylene/ethylene/hexene-1, ethylene/propylene/octene-1, ethylene/propylene/norbornene and the like.

In particular embodiments, the process of the present invention is for the polymerization of propylene to form homopolypropylene or together with another monomer, preferably ethylene, to form propylene copolymers.

Polymerization Processes

The present invention also relates to a process for polymerizing one or more olefins, preferably propylene, either alone or in the presence of another comonomer, such as ethylene, the process comprising contacting under polymerization conditions one or more olefin monomers with a catalyst system comprising an activator of formula (1) as defined above. Thus, analogously, the present invention also relates to the use of a compound of formula (1) as defined above as an activator in a catalyst system for the polymerization of one or more olefins, preferably propylene, either alone or in the presence of another comonomer, such as ethylene.

Additionally, the present invention relates to a process for polymerizing one or more olefins, preferably propylene, either alone or in the presence of another comonomer, such as ethylene, the process comprising contacting under polymerization conditions one or more olefin monomers with a catalyst system comprising an activator of formula (2) as defined above. One characteristic of this process is that the Mw of the polymer formed increases or at least does not substantially decrease with increasing monomer conversion at one given reaction temperature. For the purposes of this invention, by stating that at a given reaction temperature the weight average molecular weight (Mw) of the polymer formed increases or at least does not substantially decrease with increasing monomer conversion it is meant that the slope of the Mw versus the monomer conversion is positive or essentially zero over the entire range of monomer conversion. To quantify, with the processes and the catalyst systems of the present invention the Mw does not decrease more than 20%, preferably the Mw does not decrease more than 15%, more preferably the Mw does not decrease more than 9%, and more preferably the Mw does not decrease more than 5% for each further 5% of monomer conversion. Increased conversion can be achieved by means of a low monomer concentration in the feed, a higher catalyst concentration or simply by longer reaction times.

In the processes of the present invention, using a catalyst system comprising an activator of formula (1) or (2) in combination with a transition metal compound propylene homo- or copolymers can be obtained that have high melting points and/or high Mw.

The catalyst systems described above are suitable for use in a solution, bulk, gas or slurry polymerization process or a combination thereof, preferably solution phase or bulk phase polymerization process. Preferably the process is a continuous process. By continuous is meant a system that operates without interruption or cessation. For example a continuous process to produce a polymer would be one where the reactants are continually introduced into one or more reactors and polymer product is continually withdrawn.

In one embodiment, this invention is directed toward the solution, bulk, slurry or gas phase polymerization reactions involving the polymerization of one or more of monomers as defined above. Preferably a homopolypropylene or a copolymer of propylene and ethylene and/or more other alpha-olefins or diolefins as listed above is produced.

One or more reactors in series or in parallel may be used in the present invention. Catalyst precursor and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO 01/30862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst compounds can be added to the first reactor in the series. The catalyst component may also be added to both reactors, with one component being added to first reaction and another component to other reactors.

In one embodiment 500 ppm or less (wt basis) of hydrogen is added to the polymerization reactor, or 400 ppm or less, or 300 ppm or less. In other embodiments at least 50 ppm of hydrogen is added to the polymerization mixture, or 100 ppm or more, or 150 ppm or more.

One characteristic feature of the olefin polymerization process according to the present invention comprising the use of the catalyst systems having activators of formula (1) or (2) according to the present invention is that, at one given reaction temperature the Mw of the polymer formed increases (or at least does not substantially decrease, as explained above) with increasing monomer conversion. This is illustrated in FIG. 1. This behavior is quite different from known polymerization processes using conventional catalyst systems, where—in contrast to the present invention—the slope of the Mw versus the monomer conversion is usually negative. Again, without wishing to be bound by this theory, it is believed that the balanced coordination strength (or basicity) of the Lewis base originating from the proton-depleted cationic component of the activator is the reason for this unusual characteristic.

The fact that higher Mw polymers can be produced at higher monomer conversion rates means that the conversion can be increased in commercial reactors, e.g. by using low monomer concentration in the feed or long run times, by using a higher catalyst concentration, or by raising the reaction temperature, which makes them more efficient by reducing the monomer concentration in the effluent and reducing operation cost associated with monomer separation and recirculation. In many processes to date, conversion rate is controlled in order to keep the Mw (and the melting point) of the resulting polymer sufficiently high, which had a limiting effect on the quantity of the production output. This limitation is overcome or at least alleviated by the present invention.

This effect is particularly shown by the less substituted metallocenes used together with the more coordinating amines, such as by rac-dimethylsilylbisindenylhafnium dimethyl, rac-dimethylsilylbisindenylzirconium dimethyl, rac-dimethylgermylbisindenylhafnium dimethyl, rac-ethylenebisindenylhafnium dimethyl, rac-ethylenebisindenylzirconium dimethyl. More substituted metallocenes may show this effect with highly coordinating amines Depending on which monomer(s) is/are to be polymerized, various polymerization processes (gas phase, slurry phase, solution polymerization) may be used in connection with the present invention.

Gas Phase Polymerization

Generally, in a fluidized gas bed process useful herein for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See for example U.S. Pat. Nos. 4,543,399; 4,588,790; 5,028,670; 5,317,036; 5,352,749; 5,405,922; 5,436,304; 5,453,471; 5,462,999; 5,616,661 and 5,668,228.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst system are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. Preferably, a hexane or an isobutane medium is employed.

In one embodiment, a preferred polymerization technique useful in the invention is referred to as a particle form polymerization or a slurry process where the temperature is kept below the temperature at which the polymer goes into solution. Such technique is described in U.S. Pat. No. 3,248,179, which is fully incorporated herein by reference. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In the slurry process useful in the invention the total reactor pressure is in the range of from 400 psig (2758 kPa) to 800 psig (5516 kPa), preferably 500 psig (3448 kPa) to about 650 psig (4482 kPa), more preferably from about 525 psig (3620 kPa) to 625 psig (4309 kPa). The concentration of predominant monomer in the reactor liquid medium may be in the range of from about 1 to 10 weight percent, preferably from about 2 to about 7 weight percent, more preferably from about 2.5 to about 6 weight percent, more preferably from about 3 to about 6 weight percent.

Homogeneous, Bulk, or Solution Phase Polymerization

The catalyst systems described herein can be used advantageously in homogeneous solution processes. Generally this involves polymerization in a continuous reactor in which the polymer formed and the starting monomer and catalyst materials supplied are agitated to reduce or avoid concentration gradients. Some useful processes operate above the cloud point of the polymers at high pressures. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutene, mixed butanes, hexane, pentane, isopentane, isohexane, cyclohexane, isooctane, and octane.

Temperature control in the reactor is typically obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature also depends on the catalyst used. In general, the reactor temperature is in the range from about 30° C. to about 250° C., preferably from about 60° C. to about 200° C., more preferably from about 70° C. to about 180° C., more preferably from about 80° C. to about 160° C., and more preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure is generally in the range from atmospheric pressure up to high pressures such as about 300 MPa, about 200 MPa or about 100 MPa. Also lower pressures up to about 50, about 40, about 30, about 20 or about 15 MPa are suitable. The lower end of the possible pressure range may be anything from about 0.1 MPa, such as 0.5 MPa, about 1 MPa or about 2.0 MPa. The monomer concentration in the reactor (based on the entire reaction mixture) may be anywhere from very dilute up to using the monomer as the solvent (e.g. polymerizing propylene in bulk propylene). Suitable monomer concentrations may be, for example up to about 2 mol/L, up to about 5 mol/L, up to about 10 mol/L, or even higher, such as up to about 15 mol/L.

In one embodiment 500 ppm or less of hydrogen is added to the polymerization mixture, or 400 ppm or less or 300 ppm or less. In other embodiments at least 50 ppm of hydrogen is added to the polymerization mixture, or 100 ppm or more, or 150 ppm or more.

Each of these processes may also be employed in single reactor, parallel or series reactor configurations in a suitable diluent or solvent. Hydrocarbon solvents are suitable, both aliphatic and aromatic. Alkanes, such as n- or isohexane, pentane, isopentane, and octane, are preferred. Also, chlorinated or fluorinated hydrocarbons may be used as solvents. Suitable fluorinated hydrocarbons listed in WO 2004/058828.

Finally, all polymerization conditions specifically disclosed in WO 2004/026921, WO 2004/056953 and U.S. Provisional Application No. 60/933,007, which are incorporated herein by reference, may be used in the processes of the present invention.

Preferred Polymerization Process

Preferably, the polymerization processes according to the present invention using activators of formula (1) or (2) in combination with a transition metal compound, preferably a metallocene, are solution processes, wherein polymerization is conducted at a temperature of at least about 60° C., or at least about 80° C., or at least about 100° C., or at least about 120° C., or at least about 140° C. Preferably, the polymerization processes according to the present invention using activators of formula (1) and/or (2) in combination with a metallocene as described above are run with a monomer conversion of from 5 to 95%, alternately 5 to 95%, alternately from 5 to 90%, alternately from 5 to 85%, alternately from 5 to 80%, alternately from 5 to 75%, alternately from 5 to 70%, alternately from 5 to 65%, alternately from 5 to 60%, alternately from 7.5 to 60%, alternately from 7.5 to 55%, alternately from 7.5 to 50%, and alternately from 10 to 50%, all percentage being based on the theoretically possible 100% conversion. For the purposes of the present invention the conversion is calculated on a weight basis (the actual amount (weight in gram) polymer obtained, divided through the theoretically possible amount (again weight in gram) of polymer if all monomer was converted into polymer). As an example, as propylene has a density of 0.52 g/mL, if 100 mL propylene monomer is fed into the reactor, theoretically 52 g polypropylene could be obtained (assuming a theoretical 100% conversion). The % conversion achieved in a particular polypropylene reaction run with 100 mL of propylene feed is therefore calculated as follows: conversion [%]=(actual weight (g) polypropylene recovered/52 g)×100%. So, for example, if 5.2 g of polymer are recovered, the conversion would be 10%.

Particularly preferred polymerization processes according to the present invention include the following:

A process for polymerizing one or more olefins, preferably propylene, optionally in combination with another olefin comonomer, the process comprising contacting under polymerization conditions one or more olefin monomers with a catalyst system comprising an activator of formula (1) are defined above and are a separate aspect of the present invention. Preferred metallocenes for use in combination with the preferred activators of formula (1) are also disclosed above. Preferred activators of formula (1) and preferred metallocenes for use in this process are disclosed hereinabove. Preferably, in this process the polymerization is conducted in (homogeneous) solution and at a temperature of at least about 80° C., preferably of at least about 100° C., more preferably of at least about 120° C. The solvent may either be an alkane, or it may be the olefin (propylene) itself.

A process for polymerizing one or more olefins, preferably propylene, optionally in combination with one or more other olefin comonomer(s), the process comprising contacting under polymerization conditions one or more olefin monomers with a catalyst system comprising a metallocene and an activator of formula (2) as defined above, wherein the Mw of the polymer formed increases with increasing monomer conversion at a given reaction temperature. Preferred activators of formula (2) and preferred metallocenes are disclosed hereinabove. A particularly preferred activator of formula (2) in this process is trimethylammonium tetrakis(pentafluorophenyl)borate or trimethylammonium tetrakis(heptafluoronaphthyl)borate. Particularly preferred metallocenes in combination with this preferred activator of formula (2) are rac-dimethylsilyl bis(indenyl)zirconium dimethyl and -dichloride, rac-dimethylsilyl bis(indenyl)hafnium dimethyl, rac-ethylenyl bis(indenyl)zirconiumdimethyl and -dichloride, and rac-ethylenyl bis(indenyl)hafniumdimethyl and -dichloride. Also in this process using an activator of formula (2) preferably the polymerization is conducted in solution (typically homogeneous) and at a temperature of at least about 80° C. to about 200° C., preferably of at least about 100° C. to about 180° C., more preferably of at least about 120° C. The solvent may either be an n- or iso-alkane, or it may be the olefin (such as propylene) itself. Preferably, the monomer (preferably propylene) conversion is from 5 to 95%, more preferably from 5 to 85%, and more preferably from 5 to 50%, the conversion being calculated based on the amount of monomer in the feed and the amount of monomer converted in the reactor. The monomer concentration is generally 5 weight % or more, such as 10 weight % or more, 20 weight % or more, or 30 weight % or more, based on the total weight of the polymerization medium including solvent, monomers and polymers produced.

Polymer Products

The polymers produced herein include homopolymer and copolymers of ethylene and/or propylene with optional other monomers. The polymers are obtainable by the processes as described above. Preferably, the polymers are propylene-based polymers, optionally with ethylene and/or other alpha-olefin comonomers being present.

The polymers, especially the propylene-based polymers, produced with the polymerization processes according to the present invention (and using the catalyst systems according to the present invention comprising activators of formula (1) and/or (2)) may have higher melting points and a higher Mw than polymers prepared by comparative processes using conventional catalyst systems at the same reaction temperature. See in this regard FIGS. 2a and 2b, 3a and 3b, and 4. For example, with reference to FIGS. 2a and 2b, it is illustrated that the choice of the catalyst system, and in particular the cationic component of the activator in said catalyst system, influences the Mw and the melting point of the resulting polymer achieved at a certain reaction temperature. It is evident that with the catalyst system according to the invention, wherein the activator is of formula (1) or formula (2) as defined above, the resulting polymer has higher Mw and a higher melting point than with a comparable conventional activator in combination with the same metallocene compound. This effect is further illustrated in FIG. 4, where the choice of the cationic component of the activator is shown to influence the melting point of the resulting polymer. Particularly, when compared to polymers having the same ethylene content but prepared using different activators in combination with the same metallocene compound, polymers of the invention have elevated melting points when the activator is of formula (2) as defined above.

The same is also evident from FIGS. 3a and 3b. As explained above, without wishing to be bound by this theory, it is believed that the coordination strength of the Lewis base resulting from the proton-depleted cationic component of the activator is of importance and is balanced in order to achieve an optimal effect.

The polymers, especially the propylene-based polymers, produced via the polymerization processes according to the present invention (and using the catalyst systems according to the present invention comprising activators of formula (2)) may also have narrower composition distributions than polymers prepared by comparative processes using different activators in combination with the same metallocene compound. See, for example, FIG. 5, which illustrates via Temperature Rising Elution Fractionation (TREF) that a propylene-ethylene copolymer prepared using an activator of formula (2), as defined above, has a narrower composition than a polymer having similar ethylene content prepared using a catalyst system comprising a different activator but the same metallocene compound.

The polymers of the invention generally have an Mw (weight average molecular weight in g/mol) of at least about 20,000, or at least about 35,000, or at least about 40,000, but may also have a higher Mw of at least about 60,000, or at least about 70,000, or at least about 100,000. Polymers of the invention alternately may have an Mw less than about 400,000 g/mol, or less than about 350,000 g/mol, or less than about 300,000 g/mol, or less than about 250,000 g/mol, or less than about 200,000 g/mol.

The polymers described herein generally have an Mw/Mn (polydispersity, PDI, MWD) of between about 1 and about 20, or from about 1.3 to about 15, or from about 1.5 to about 10, or from about 1.6 to about 6, or from about 1.7 to about 4.5, or from about 1.8 to about 3, or from about 1.9 to about 2.7, or from about 2.0 to about 2.4.

The polymers described herein preferably have a melting point (Tm) of at least 25° C., or at least 50° C., or at least 75° C., or at least 90° C., or at least 100° C., or at least 110° C., or at least 120° C., or at least 130° C., or at least 135° C., or at least 140° C.

The propylene-based polymers of the present invention preferably have a melting point of at least 70° C. and a weight average molecular weight (Mw) of at least 10,000, or a melting point of at least 90° C. and a Mw of at least 35,000, or a melting point of at least 100° C. and a Mw of at least 50,000.

Alternately, the propylene-based polymers of the present invention may be characterized by a particular relationship between comonomer content and melting point. For example, when the comonomer is ethylene, propylene-based polymers of the present invention may satisfy the following relationship:

$$Tm > -6.2*e + 125,$$

where e is the ethylene content of the polymer composition in weight percent and is less than about 40 wt %. Polymers of the present invention which satisfy the above relationship have generally higher melting points than propylene-based polymers having the same comonomer content but produced using a catalyst system with a different activator. It is generally known in the art that melting behavior, and therefore the melting point of a polymer, is a function of ethylene content.

The present invention, in contrast, provides an additional method for increasing the melting point of a propylene-ethylene copolymer while maintaining a constant ethylene content by altering the catalyst system used. Higher melting temperatures, in turn, lead to improved properties such as polymer pellet stability, higher service temperature in heat seal applications, and improved modulus and structural integrity in films and fabricated parts.

The melting temperature of a polymer is typically measured by differential scanning calorimetry (DSC). A typical DSC procedure is set forth in the examples section below.

The polymers of the present invention may also be characterized by a heat of fusion ("$\Delta H$" or "Hf") also measured by DSC. In one or more embodiments of the present invention, the polymers have a heat of fusion less than about 100 J/g, or less than about 90 J/g, or less than about 85 J/g, or less than about 80 J/g, or less than about 75 J/g, or less than about 70 J/g, or less than about 65 J/g, or less than about 60 J/g, or less than about 55 J/g, or less than about 50 J/g, or less than about 45 J/g.

The polymers of the present invention generally have a density in the range of from 0.85 g/cc to 0.97 g/cc, preferably in the range of from 0.86 g/cc to 0.94 g/cc more preferably in the range of from 0.86 g/cc to 0.91 g/cc, even more preferably in the range of from 0.86 g/cc to 0.90 g/cc.

In some embodiments, the polymer produced comprises at least 50 wt % propylene, or at least 60% propylene, or at least 70% propylene, or at least 80% propylene.

In another embodiment, the polymer produced comprises comonomer in from about 0.1 to about 99 wt %, or from about 0.1 to about 50 wt %, or from about 1 to about 35 wt %, or from about 0.2 to about 30 wt %, or from about 2 to about 25 wt %.

When the polymer produced is a propylene-ethylene copolymer, the polymer may comprise from about 0.5 to about 40 wt %, or from about 1 to about 35 wt %, or from about 1 to about 30 wt %, or from about 2 to about 25 wt %, or from about 3 to about 18 wt %, or from about 5 to about 15 wt % units derived from ethylene.

Further, polymers of the present invention may be characterized by the fraction of the polymer which is amorphous. Semi-crystalline materials such as, for example, polyolefins, are characterized as having an amorphous phase and a crystalline phase. Much of their properties are derived from the amount and morphology of these two phases. Hardness and strength, for example, are increased with increasing crystallinity whereas flexibility and toughness, for examples, are increased with decreasing crystallinity. This is generally true for high-crystalline materials like plastics, intermediate materials like plastomers and low-crystalline materials like elastomers or rubbers.

In many semi-crystalline materials, and particularly in semi-crystalline polyolefin plastics, the strength and hardness arise from the crystalline phase of the polymer. The crystallinity acts as hard-block crosslink points with interconnecting chains. The overall network formed resists deformation on strain. In plastics this results in high hardness and improved strength. The flexibility and toughness of the semi-crystalline polyolefin arises from the amorphous phase where the chains are entangled randomly. Freedom of the entangled chains to move provides a mechanism for the polymer to absorb impact and flex. There is a balance of desired properties in many polymer applications where better toughness or flexibility is achieved by reducing the crystallinity. However, lowering crystallinity reduces the strength and hardness of the polymer. Conversely, stronger, harder semi-crystalline materials are achieved by increasing the crystallinity at the expense of toughness and flexibility.

The TREF data reported herein were measured using an analytical size TREF instrument (Polymerchar, Spain), with a column of the following dimensions: inner diameter (ID) 7.8 mm, outer diameter (OD) 9.53 mm, and column length of 150 mm. The column was filled with steel beads. 0.5 mL of a 4 mg/ml polymer solution in orthodichlorobenzene (ODCB) containing 2 g BHT/4 L were charged onto a the column and cooled from 140° C. to −15° C. at a constant cooling rate of 1.0° C./min. Subsequently, ODCB was pumped through the column at a flow rate of 1.0 ml/min, and the column temperature was increased at a constant heating rate of 2° C./min to elute the polymer. The polymer concentration in the eluted liquid was detected by means of measuring the absorption at a wavenumber of 2941 cm$^{-1}$ using an infrared detector. The concentration of the ethylene-α-olefin copolymer in the eluted liquid was calculated from the absorption and plotted as a function of temperature.

In some embodiments, propylene-ethylene copolymers of the present invention satisfy the following relationship:

$$Fa < 7*e+35,$$

where Fa is the soluble fraction of the polymer, in percent and e is the ethylene content of the polymer in weight percent.

In other embodiments, propylene-ethylene copolymers of the present invention satisfy the following relationship:

$$Fa < 7*e+38,$$

where Fa is the soluble fraction of the polymer, in percent and e is the ethylene content of the polymer in weight percent, In other embodiments, propylene-ethylene copolymers of the present invention satisfy the following relationship:

$$Fa < 7*e+40,$$

where Fa is the soluble fraction of the polymer, in percent and e is the ethylene content of the polymer in weight percent. Propylene-ethylene copolymers of the present invention generally have a lower soluble fraction in a TREF experiment than comparable propylene-based polymers having the same comonomer content but produced using catalyst systems with a different activator.

In certain embodiments, the polymers as described herein may have a narrow composition distribution characterized in that the $T_{75}-T_{25}$ value is less than 35, or less than 30, or less than 25, or less than 20, wherein $T_{25}$ is the temperature at which 25% of the eluted polymer is obtained and $T_{75}$ is the temperature at which 75% of the eluted polymer is obtained in a TREF experiment as described herein.

Some propylene-ethylene copolymers of the present invention are further characterized by a narrow composition distribution. One way to measure the composition distribution of a polymer is by its composition distribution breadth index (CDBI). CDBI is defined as the weight percent of the copolymer molecules having a comonomer content within 50% of the median total molar comonomer content. The composition distribution of a polymer composition is known to influence various properties of the polymer, such as its extractables content, impact properties, heat sealing properties, and structural properties (such as tear strength in films), for example. It is generally known in the art that a polymer's composition distribution is largely determined by the catalyst system used to produce that polymer.

The CDBI of a copolymer is readily determined utilizing well known techniques for isolating individual fractions of a sample of the copolymer. One such technique is Temperature Rising Elution Fraction (TREF), as described in Wild, et al., J. Poly. Sci., Poly. Phys. Ed., Vol. 20, pg. 441 (1982) and U.S. Pat. No. 5,008,204, which are incorporated herein by reference in full. Another such technique is Crystallization Analysis Fractionation (CRYSTAF), which is described in greater detail in U.S. Patent Application Publication No. 2008/0015316, also incorporated herein by reference in full.

Propylene-ethylene copolymers of the present invention may have CDBI values of from about 50 to about 99%, or from about 55 to about 90%, or from about 60 to about 90%. In other embodiments, propylene-ethylene copolymers of the present invention may have CDBI values greater than about 50%, greater than about 55%, greater than about 60%, or greater than about 65%.

Applications and End-Uses

The polymers produced by the processes of the invention are useful in making a wide variety of products and useful in many end-use applications. The polymers produced by the processes of the invention include linear low density polyethylenes, elastomers, plastomers, high density polyethylenes, low density polyethylenes, polypropylene and polypropylene copolymers, including but not limited to impact and random copolymers.

Polymers produced by the process of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, and oriented films. The films are useful in snack packaging, heavy duty bags, grocery sacks, baked and frozen food packaging, medical packaging, industrial liners, membranes, and many other applications, and may be used in food-contact or non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, toys, etc. Polymers with low molecular weight can also be used for adhesive applications, particularly for hot melt adhesives.

Further embodiments include:

A. A catalyst system comprising a transition metal compound and an activator, the activator having the formula (1):

$$[R^1R^2R^3AH]^+[Y]^-, \qquad (1)$$

wherein:

[Y]$^-$ is a non-coordinating anion (NCA),

A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system.

B. The catalyst system of embodiment A, wherein A is nitrogen, $R^1$ and $R^2$ together are a —$(CH_2)_a$— group with a being 3, 4, 5 or 6, and $R^3$ is $C_1$ to $C_5$ alkyl.

C. The catalyst system of embodiment A or B, wherein $[Y]^-$ is $[B(R^4)_4]^-$, with $R^4$ being an unsubstituted aryl group or a substituted aryl group, of which the one or more substituents are identical or different and are selected from the group consisting of $C_1$ to $C_{10}$ alkyl, $C_5$ to $C_{15}$ aryl, a halogen atom, preferably fluorine, halogenated $C_1$ to $C_{10}$ alkyl, halogenated $C_5$ to $C_{15}$ aryl, halogenated $C_6$ to $C_{25}$ alkylaryl, and halogenated $C_6$ to $C_{25}$ arylalkyl groups, and wherein $R^4$ is preferably perfluorinated aryl, more preferably pentafluorophenyl, heptafluoronaphthyl or perfluorobiphenyl.

D. The catalyst system of any embodiment A to C, wherein the transition metal compound is a metallocene, preferably a dialkylsiladiylbis(indenyl)metallocene, wherein the metal is a group 4 metal and the indenyl is unsubstituted or substituted by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and the metallocene is more preferably selected from the group consisting of a rac-dimethylgermylbis(indenyl)hafnocene or -zirconocene, a rac-dimethylsilyl bis(indenyl)hafnocene or -zirconocene, a rac-dimethylsilyl bis(2-methyl-4-phenylindenyl)hafnocene or -zirconocene, a rac-dimethylsilyl bis(2-methyl-indenyl) hafnocene or -zirconocene, a rac-dimethylsilyl bis(2-methyl-4-naphthylindenyl) hafnocene or -zirconocene, or a rac-ethylenyl bis(indenyl)hafnocene or -zirconocene, wherein the hafnocene and zirconocene has at least two leaving groups $X_1$ and $X_2$ which are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

E. The catalyst system of any embodiment A to D, wherein the transition metal compound and/or the activator are supported on a solid support, wherein the support comprises silica or alumina.

F. A process for polymerizing one or more olefins, comprising contacting under polymerization conditions one or more olefin monomers with a catalyst system according to any embodiment A to E.

G. Use of a compound of formula (1) as defined in any embodiment A to E as activator of a transition metal compound in a catalyst system for the polymerization of one or more olefins.

H. A process for polymerizing one or more olefins, comprising contacting under polymerization conditions one or more olefin monomers with a catalyst system comprising a transition metal compound and an activator having the following formula (2):

$$[R_nAH]^+[Y]^-, \quad (2)$$

wherein:
[Y]$^-$ is a non-coordinating anion (NCA),
A is nitrogen, phosphorus or oxygen,
n is 3 if A is nitrogen or phosphorus,
n is 2 if A is oxygen,
the groups R are identical or different and are a $C_1$ to $C_3$ alkyl group, at a given reaction temperature the weight average molecular weight (Mw) of the polymer formed increases or at least does not substantially decrease with increasing monomer conversion.

I. The process of any of embodiments F or H, or the use of embodiment G, wherein the one or more olefins are alpha-olefins, and preferably propylene, optionally in combination with another alpha-olefin.

J. The process of any of embodiments F, H, or I, or the use of embodiment G or I, wherein the activator is a combination of at least two different compounds of formula (1) as defined in any of embodiments A to E and/or formula (2) as defined in embodiment H.

K. The process of any of embodiments F, H, or I, or any use of embodiments G-J, wherein $[R_nAH]^+$ is trimethylammonium, and $[Y]^-$ is tetrakis(pentafluorophenyl)borate, tetrakis(heptafluoronaphthyl)borate or tetrakis(perfluorobiphenyl)borate.

L. The process or use of embodiment K, wherein the transition metal compound is a metallocene selected from the group consisting of a rac-dimethylgermylbis(indenyl)hafnocene or -zirconocene, a rac-dimethylsilyl bis(indenyl)hafnocene or -zirconocene, a rac-dimethylsilyl bis(2-methyl-4-phenylindenyl)hafnocene or -zirconocene, a rac-dimethylsilyl bis(2-methyl-indenyl)hafnocene or -zirconocene, a rac-dimethylsilyl bis(2-methyl-4-naphthylindenyl) hafnocene or -zirconocene, or an ethylenyl bis(indenyl) hafnocene or -zirconocene, wherein the hafnocene and zirconocene has at least two leaving groups $X_1$ and $X_2$ which are as defined in embodiment D.

M. The process of any of embodiments F, H-L, or the use of any of embodiments G or I-L, wherein the polymerization is conducted in solution and at a temperature of at least about 80° C., preferably of at least about 100° C., more preferably of at least about 120° C.

N. The process of any of embodiments F, H-M, or the use of any of embodiments G or I-M, wherein the monomer conversion is from 5 to 50%, preferably 5 to 98%.

O. A polymer obtainable by a process according to embodiment F or any of embodiments H-N.

P. A copolymer composition comprising units derived from propylene and ethylene, where the copolymer comprises from about 0.1 to about 20 wt % units derived from ethylene, and:
  i. the density of the copolymer composition is less than about 0.900 g/cc,
  ii. the heat of fusion of the copolymer composition is less than about 75 J/g,
  iii. the melting point of the composition satisfies the relation $T_m > -6.2*e+125$, where e is the ethylene content of the composition in wt % and Tm is the melting point in degrees Celsius,
  iv. the copolymer is prepared using one or more metallocene catalysts, and
  v. the copolymer composition has a $T_{75}-T_{25}$ value of less than 35, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

Q. The copolymer composition of embodiment P, wherein the copolymer comprises from about 2 to about 20 wt % units derived from ethylene, or from about 3 to about 16 wt % units derived from ethylene, or from about 5 to about 14 wt % units derived from ethylene.

R. The copolymer composition of any of embodiments P or Q, wherein the density of the composition is less than about 0.970 g/cc.

S. The copolymer composition of any of embodiments P-R, wherein the density of the composition is from about 0.860 to about 0.900 g/cc.

T. The copolymer composition of any of embodiments P-S, wherein the molecular weight of the copolymer is from about 20,000 to about 400,000 g/mol.

U. The copolymer composition of any of embodiments P-T, wherein the molecular weight distribution of the copolymer is from about 2.0 to about 2.4.

V. The copolymer composition of any of embodiments P-U, wherein the soluble fraction, $F_a$, of the copolymer satisfies the following relation:

$$F_a < 7*e + 35,$$

where e is the ethylene content of the composition in wt %.

W. The copolymer of any of embodiments P-V, wherein the $T_{75}-T_{25}$ value of the copolymer is less than 30, where $T_{25}$ is the temperature in degrees Celsius at which 25% of the eluted polymer is obtained and $T_{75}$ is the temperature in degrees Celsius at which 75% of the eluted polymer is obtained via TREF.

X. A process for the production of one or more copolymer compositions comprising contacting propylene and one or more comonomers with a catalyst system under polymerization conditions, where:
  a. the catalyst system comprises a transition metal compound and an activator, the activator having the formula:

$$[R_nAH][Y]^+,$$

where the R groups may be identical or different and are a $C_1$ to $C_3$ alkyl group; A is nitrogen, phosphorus, or oxygen; n is 3 if A is nitrogen or phosphorus and n is 2 if A is oxygen; and $[Y]^+$ is a non-coordinating anion; and
  b. the copolymer composition comprises units derived from propylene and ethylene, where the copolymer comprises from about 0.1 to about 20 wt % units derived from ethylene, and:
    i. the density of the copolymer composition is less than about 0.900 g/cc,
    ii. the heat of fusion of the copolymer composition is less than about 75 J/g,
    iii. the melting point of the composition satisfies the relation $T_m > -6.2*e + 125$, where e is the ethylene content of the composition in wt % and Tm is the melting point in degrees Celsius,
    iv. the copolymer is prepared using one or more metallocene catalysts, and
    v. the copolymer composition has a $T_{75}-T_{25}$ value of less than 35, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

Y. The process of embodiment X, wherein the copolymer comprises from about 2 to about 20 wt % units derived from ethylene, or from about 3 to about 16 wt % units derived from ethylene, or from about 5 to about 14 wt % units derived from ethylene.

Z. The process of any of embodiments X or Y, wherein the density of the composition is less than about 0.970 g/cc.

AA. The process of any of embodiments X-Z, wherein the density of the composition is from about 0.860 to about 0.900 g/cc.

BB. The process of any of embodiments X-AA, wherein the molecular weight of the copolymer is from about 60,000 to about 200,000 g/mol.

CC. The process of any of embodiments X-BB, wherein the molecular weight distribution of the copolymer is from about 2.0 to about 2.4.

DD. The process of any of embodiments X-CC, wherein the soluble fraction, $F_a$, of the copolymer satisfies the following relation:

$$F_a < 7*e + 35,$$

where e is the ethylene content of the composition in wt %.

EE. The process of any of embodiments X-DD, wherein the $T_{75}-T_{25}$ value of the copolymer is less than 30, where $T_{25}$ is the temperature at which 25% of the eluted polymer is obtained and $T_{75}$ is the temperature at which 75% of the eluted polymer is obtained via TREF.

FF. The process of any of embodiments X-EE, wherein the activator has the formula $[Me_3NH][Y]^+$, where Me denotes a methyl group.

GG. The process of any of embodiments X-FF, wherein the transition metal compound is a dialkylsilylbis(indenyl)metallocene, wherein the metal is a group 4 metal and the indenyl is unsubstituted or substituted by one or more substituents selected from the group consisting of a halogen atom, $C_1$ to $C_{10}$ alkyl, $C_5$ to $C_{15}$ aryl, $C_6$ to $C_{25}$ arylalkyl, $C_6$ to $C_{25}$ alkylaryl, and wherein the metallocene has two leaving groups, $X_1$ and $X_2$, which are both halogen or $C_1$ to $C_3$ alkyl.

HH. The process of embodiment FF, wherein $[Y]^+$ is tetrakis(pentafluorophenyl)borate, tetrakis(heptafluorophenyl)borate, or tetrakis(perfluorophenyl)borate.

II. The process of any of embodiments X-HH, wherein the process is a solution process.

JJ. An article comprising the copolymer composition of any of paragraphs P-W.

KK. The article of paragraph JJ, where the article is a film, fiber, nonwoven fabric, or molded article.

LL. A polymer pellet comprising the copolymer composition of any of embodiments P-W.

The following references disclose conventional catalysts and processes, which are each incorporated herein by reference: EP-A-0 277 004, WO 91/02012, M. A. Giardello, M. S. Eisen, Ch. L. Stern and T. J. Marks in J. Am. Chem. Soc. 1995, 117, 12114-12129, EP-A-0 630 910, U.S. Pat. No. 5,817,590, E. A. Sanginov, A. N. Panin, S. L. Saratovskikh, N. M. Bravaya, in Polymer Science, Series A (2006), 48(2), 99-106, U.S. Pat. No. 5,416,177, WO 2005/016980, WO 01/62764, WO 01/68718, WO 2004/005360, WO 01/48035, WO 03/035708.

EXAMPLES

Polymer Characterizations

GPC Method "C"—Gel Permeation Chromatography—Alliance 2000 DRI Only

This method used a Waters Alliance 2000 gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 1.0 mL/min. Three (Polymer Laboratories) PLgel Mixed-B columns were used. This technique is discussed in "*Macromolecules*, Vol. 34, No. 19, pp. 6812-6820" which is incorporated herein by reference.

The separation efficiency of the column set was calibrated using a series of narrow molecular weight distribution polystyrene standards, which reflects the expected molecular weight range for samples and the exclusion limits of the column set. At least 10 individual polystyrene standards, ranging from Mp ~580 to 10,000,000, were used to generate the calibration curve. The polystyrene standards were obtained from Polymer Laboratories (Amherst, Mass.) or an equivalent source. To assure internal consistency, the flow rate was corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) was generated by recording the retention volume at the peak in the DRI signal for each PS standard, and fitting this data set to a second order polynomial. Polystyrene standards were graphed using Viscotec 3.0 software. Samples were analyzed using WaveMetrics, Inc. IGOR Pro and Viscotec 3.0 software using updated calibration constants.

Differential Scanning Calorimetry

Peak melting point (Tm) and peak crystallization temperature (Tc), glass transition temperature (Tg), and heat of fusion (ΔH) were determined using the following procedure according to ASTM D3418-03. Differential scanning calorimetric (DSC) data were obtained using a Perkin Elmer Pyris 1 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 5 minutes then cooled down to −100° C. at a rate of 10° C./minute before a second cooling-heating cycle was applied. Both the first and second cycle thermal events were recorded. Areas under the endothermic peaks of the $2^{nd}$ melting curve were measured and used to determine the heat of fusion. The melting and crystallization temperatures reported here were obtained during the second heating/cooling cycle.

Comonomer Content

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under the propylene band at ~1165 $cm^{-1}$ and the area under the ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt. % was calculated according to the following equation:

$$\text{ethylene content (wt. \%)} = 72.698 - 86.495X + 13.696X^2$$

where $X = AR/(AR+1)$ and AR is the ratio of the area for the peak at ~1165 $cm^{-1}$ to the area of the peak at ~732 $cm^{-1}$.

Viscosity

Viscosity was measured using a Brookfield digital viscometer and a number 27 spindle according to ASTM D-3236.

Proton NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn was calculated by dividing the total number of unsaturated species into 14,000.

The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Catalyst Synthesis

Synthetic procedures involving air-sensitive compounds were performed in a Vacuum Atmospheres drybox maintained under a $N_2$ atmosphere. Anhydrous solvents were purchased from Aldrich and dried over 2 Å sieves. $Me_3NHCl$ and N-Methylpyrrolidine were purchased from Aldrich. $Me_2Si(C_9H_6)_2HfMe_2$ and $C_2H_4(C_9H_6)_2ZrMe_2$ were purchased from Boulder Scientific. $Me_2Ge(C_9H_6)_2HfMe_2$ was synthesized as disclosed in the art. $[Ph_3C][B(C_6F_5)_4]$, $[PhNMe_2H][B(C_{10}F_7)_4]$ and $[Na][B(C_{10}F_7)_4]$ were purchased from Grace Davison. $[nBu_3NH][B(C_6F_5)_4]$ and $[PhNMe_2H][B(C_6F_5)_4]$ were purchased from Albemarle. The individual syntheses of activators used in the examples are described in the following:

Trimethylammonium tetrakis(pentafluorophenyl)borate $LiB(C_6F_5)_4 \cdot Et_2O$ (3.3 g, 4.3 mmol) was dissolved in 100 ml $CH_2Cl_2$ at ambient temperature. Solid $Me_3NHCl$ (0.41 g, 4.3 mmol) was added to the reaction mixture in portions over 10 minutes. The reaction mixture was stirred for 15 hours and was filtered tough a glass frit with Celite to remove LiCl. The colorless filtrate was reduced in vacuo to a white solid. The product was dried in vacuo for 1 hour at 50° C. to yield 2.7 g of product. $^1$H NMR ($CCl_2D_2$) δ ppm: 6.4 (br s, 1H), 2.97 (d, 9H).

Trimethylammonium tetrakis(heptafluoro-2-naphthyl)borate $NaB(2-C_{10}F_7)_4$ (2.2 g, 2.1 mmol) was dissolved in 100 ml $CH_2Cl_2$ and reacted with $Me_3NHCl$ (0.20 g, 2.1 mmol) for 2 hours at ambient temperature. The reaction mixture was filtered over a glass frit and the light yellow filtrate reduced in vacuo. The product was dried in vacuo for 12 hours to yield a light tan solid (1.6 g). $^1$H NMR ($CCl_2D_2$) δ ppm: 8.1 (very br s, 1H), 2.85 (d, 9H).

N-Methylpyrrolidinium tetrakis(pentafluorophenyl)borate

N-Methylpyrrolidinium hydrochloride was prepared from the respective amine by hydrochlorination using HCl (2 M, $Et_2O$) in pentane. The resulting solid product was filtered and dried in vacuo. N-methylpyrrolidine.HCl (0.35 g, 2.9 mmol) was dissolved in 150 ml dichloromethane at room temperature. Solid $LiB(C_6F_5)_4 \cdot Et_2O$ (2.2 g, 2.86 mmol) was added to the reaction mixture in portions over 10 minutes. After 2 hours the reaction mixture was filtered through a glass frit to remove LiCl and the colorless filtrate reduced in vacuo to yield a white solid. The product was dried in vacuo for 12 hours to yield 1.9 g of product. $^1$H NMR (CCl$_2$D$_2$) δ ppm: 7.55 (br s, 1H), 3.70 (m, 2H), 2.95 (m, 2H), 4.82 (d, 3H). 2.0 to 2.25 (m, 4H).

N-Methylpyrrolidinium tetrakis(heptafluoro-2-naphthyl)borate

N-methylpyrrolidinium hydrochloride (0.50 g, 4.1 mmol) was dissolved in 100 ml dichloromethane at room temperature. Solid NaB(2-C$_{10}$F$_7$)$_4$ (4.3 g, 4.1 mmol) was added to the reaction mixture in portions over 10 minutes. After 1 hour the reaction mixture was allowed to settle for an additional hour and then filtered through a glass frit to remove NaCl. The light amber-colored filtrate was reduced in vacuo to yield a tan solid. The product was dried in vacuo an additional hour at 50° C. and the final yield was 4.3 g.

$^1$H NMR (C$_6$D$_6$) δ ppm: 8.6 (br s, 1H), 2.35-2.5 (m, 2H), 1.57 (d, 3H), 1.3-1.5 (m, 2H), 0.85-1.3 (m, 4H).

Supported Catalyst Synthesis rac-Dimethylsilylbis(indenyl)hafnium dimethyl/trimethylammonium tetrakis(pentafluorophenyl)borate supported on silica Ineos ES-757 silica gel, 20 g (calcined at 600° C.) was slurried in 100 ml of toluene and reacted with 38 g triethylaluminum (25 wt % in toluene). The mixture was stirred for 12 to 15 hours at ambient temperature. Solid was collected on a glass frit, washed with hexane and dried in vacuo. The modified support was obtained as a white free-flowing solid (21.8 g). The modified ES-757 (2.0 g) was slurried in toluene (30 ml) and reacted with Activator 4 (107 mg) for 30 min. Metallocene A (72 mg) was added and allowed to react for 2 hours. The supported catalyst was isolated on a glass frit, washed with toluene (30 mLs) and dried in vacuo to yield 1.96 g supported catalyst.

Polymerization Example 1 (See FIG. 1)

Batch Polymerization of Propylene

TIBAL (triisobutylaluminum, Aldrich) (0.4 mL, 1.0 M in hexane) was added to a 1 L autoclave followed by 500 mL isohexanes at room temperature under N$_2$ purge. Propylene was then added by volume as measured from a sight glass with increments of 10 mLs. The autoclave was heated to temperature, allowed to stabilize and the total reaction pressure recorded. The catalyst system was added as a pre-activated solution of metallocene and activator in toluene solution via catalyst tube with high pressure N$_2$ flush. The flush was repeated 2 times. After polymerization was complete, the autoclave contents were cooled to room temperature and the excess pressure safely vented. The contents were transferred into a glass container and volatiles were removed by a N$_2$ purge. The polymer was dried in a vacuum oven at 70° C. for 2 to 3 hours.

The metallocenes and activators used in the batch experiments of Example 1 in various combinations are abbreviated as follows (activators that are not according to the present invention are marked with a star*):

| Metallocenes: | |
| --- | --- |
| rac-dimethylsilylbis(indenyl)hafnium dimethyl | A |
| rac-ethylenylbis(indenyl)zirconium dimethyl | B |
| rac-dimethylgermylbis(indenyl)hafnium dimethyl | C |
| Activators: | |
| Dimethylanilinium tetrakis(pentafluorophenyl)borate*, [PhNMe$_2$H]$^+$[B(C$_6$F$_5$)$_4$]$^-$ | 1* |
| Trityl tetrakis(pentafluorophenyl)borate*, [(C$_6$H$_5$)$_3$C]$^+$ [B(C$_6$F$_5$)$_4$]$^-$ | 2* |
| Tri(n)butylammonium tetrakis(pentafluorophenyl)borate*, [nBu$_3$NH]$^+$ [B(C$_6$F$_5$)$_4$]$^-$ | 3* |
| Trimethylammonium tetrakis(pentafluorophenyl)borate, [Me$_3$NH]$^+$ [B(C$_6$F$_5$)$_4$]$^-$ | 4 |
| N-methylpyrrolidinium tetrakis(pentafluorophenyl)borate [MePyrH]$^+$ [B(C$_6$F$_5$)$_4$]$^-$ | 5 |
| [H(OEt)$_2$]$^+$[B(C$_6$F$_5$)$_4$]$^-$ | 6 |
| Dimethylanilinium tetrakis(heptafluoronaphthyl)borate*, [PhNMe$_2$H]$^+$ [B(C$_{10}$F$_7$)$_4$]$^-$ | 7* |
| Trimethylammonium tetrakis(heptafluoronaphthyl)borate, [Me$_3$NH]$^+$ [B(C$_{10}$F$_7$)$_4$]$^-$ | 8 |
| N-methylpyrrolidinium tetrakis(heptafluoronaphthyl)borate, [MePyrH]$^+$ [B(C$_{10}$F$_7$)$_4$]$^-$ | 9 |

The results of the batch polymerization runs are given below in Tables 1a, 1b, 2a, 2b and 3. FIG. 1 shows the results given in Tables 1a and 1b, in particular:

Run 1 (comparative): A-1

Run 2 (comparative): A-2

Run 3 (comparative): A-3

Run 4: A-4

Run 5: A-5

TABLE 1a

| Metallocene | Activator | Propylene, mLs | Run temp ° C. | Run time min | Polymer yield g | Metal compl. mg | Metal complex Mw | Metal mmol | Activity gPP/ mmol metal. |
| --- | --- | --- | --- | --- | --- | --- | --- | --- | --- |
| A | 1 | 100 | 120 | 10 | 11.8 | 3.3 | 495.0 | 0.00667 | 1770.0 |
| A | 1 | 100 | 120 | 20 | 11.3 | 6.6 | 495.0 | 0.01333 | 847.5 |
| A | 1 | 100 | 120 | 20 | 19.3 | 6.6 | 495.0 | 0.01333 | 1447.5 |
| A | 2 | 100 | 120 | 20 | 3.85 | 6.6 | 495.0 | 0.01333 | 288.8 |
| A | 2 | 100 | 120 | 20 | 11.5 | 6.6 | 495.0 | 0.01333 | 862.5 |
| A | 3 | 100 | 120 | 20 | 5.4 | 6.6 | 495.0 | 0.01333 | 405.0 |
| A | 3 | 100 | 120 | 20 | 11.6 | 6.6 | 495.0 | 0.01333 | 870.0 |
| A | 4 | 100 | 120 | 20 | 4.6 | 6.6 | 495.0 | 0.01333 | 345.0 |
| A | 4 | 100 | 120 | 20 | 13.1 | 6.6 | 495.0 | 0.01333 | 982.5 |
| A | 5 | 100 | 120 | 20 | 6.6 | 3.3 | 495.0 | 0.00667 | 990.0 |
| A | 5 | 100 | 120 | 20 | 4.4 | 3.3 | 495.0 | 0.00667 | 660.0 |

TABLE 1b

| Metallocene | Activator | Mw (g/mol) | Mn (g/mol) | Mw/Mn | vinylenes | tri-sub | vinyls | vinylidenes | $T_m$ (DSC) °C. | ΔH, J/g | Conv. % |
|---|---|---|---|---|---|---|---|---|---|---|---|
| A | 1 | 7,508 | 3,943 | 1.9 | 0.07 | 0.06 | 1.58 | 1.89 | 70.8 | | 23.4 |
| A | 1 | 8,169 | 3,451 | 2.37 | 0.1 | 0.11 | 1.49 | 1.99 | 81.7 | 27.7 | 22.4 |
| A | 1 | 5,398 | 2,323 | 2.32 | 0.12 | 0.14 | 2.28 | 2.68 | 84.02 | 16.6 | 38.2 |
| A | 2 | 10,175 | 4,648 | 2.19 | 0.12 | 0.29 | 1.21 | 1.55 | 98.1 | 39.8 | 7.6 |
| A | 2 | 7,881 | 3,781 | 2.08 | 0.1 | 0.27 | 1.66 | 1.93 | 76.34 | | 22.8 |
| A | 3 | 9,686 | 4,376 | 2.21 | 0.12 | 0.02 | 1.14 | 1.9 | 94.7 | 35 | 10.7 |
| A | 3 | 7,571 | 3,345 | 2.26 | 0.14 | 0.09 | 1.44 | 2.01 | 74.9 | | 23.0 |
| A | 4 | 9,352 | 4,037 | 2.32 | 0.14 | 0.08 | 1.18 | 1.94 | 93.4 | 36.4 | 9.1 |
| A | 4 | 10,867 | 4,775 | 2.28 | 0.08 | 0.14 | 1.13 | 1.71 | 100.6 | 40.6 | 25.9 |
| A | 5 | 15459 | 7067 | 2.2 | 0.08 | 0.05 | 1.07 | 1.15 | 104.2 | 60.3 | 13.1 |
| A | 5 | 13520 | 6670 | 2 | 0.13 | 0.12 | 1.03 | 1.42 | 102.3 | 59.8 | 8.7 |

TABLE 2a

| Metallocene | Activator | Propylene, mLs | Run temp, °C. | Run time, min | Polymer yield, g | Metal compl. mg | Metal complex Mw | Metal mmol | Activity gPP/mmol Metal. |
|---|---|---|---|---|---|---|---|---|---|
| A | 6 | 100 | 120 | 20 | 1.3 | 8.0 | 495.0 | 0.01616 | 80.4 |
| A | 6 | 100 | 120 | 20 | 6.33 | 8.0 | 495.0 | 0.01616 | 391.7 |
| A | 7 | 100 | 120 | 20 | 10.36 | 3.3 | 495.0 | 0.00673 | 1540.0 |
| A | 7 | 100 | 120 | 20 | 8.05 | 3.3 | 495.0 | 0.00673 | 1196.6 |
| A | 8 | 100 | 120 | 20 | 11.44 | 3.3 | 495.0 | 0.00673 | 1700.5 |
| A | 8 | 100 | 120 | 20 | 3.84 | 3.3 | 495.0 | 0.00673 | 570.8 |
| A | 9 | 100 | 120 | 20 | 7.38 | 3.3 | 495.0 | 0.00673 | 1097.0 |
| A | 9 | 100 | 120 | 20 | 4.55 | 3.3 | 495.0 | 0.00673 | 676.4 |
| A | 7 | 200 | 120 | 20 | 3.64 | 3.3 | 495.0 | 0.00673 | 541.1 |
| A | 7 | 200 | 120 | 20 | 35.1 | 3.3 | 495.0 | 0.00673 | 5217.6 |
| A | 8 | 200 | 120 | 20 | 14.83 | 3.3 | 495.0 | 0.00673 | 2204.5 |
| A | 8 | 200 | 120 | 20 | 19.75 | 3.3 | 495.0 | 0.00673 | 2935.8 |
| A | 8 | 200 | 120 | 20 | 26.81 | 3.3 | 495.0 | 0.00673 | 3985.3 |
| A | 8 | 200 | 120 | 20 | 25.51 | 3.3 | 495.0 | 0.00673 | 3792.0 |
| B | 8 | 100 | 120 | 20 | 42.94 | 2.3 | 377.2 | 0.00610 | 7042.2 |
| B | 8 | 100 | 120 | 20 | 49.94 | 2.3 | 377.2 | 0.00610 | 8190.2 |
| C | 1 | 100 | 120 | 20 | 7.02 | 3.6 | 539.3 | 0.00668 | 1051.6 |
| C | 1 | 100 | 120 | 20 | 2.93 | 3.6 | 539.3 | 0.00668 | 438.9 |
| C | 4 | 100 | 120 | 20 | 3.14 | 3.6 | 539.3 | 0.00668 | 470.4 |
| C | 4 | 100 | 120 | 20 | 4.46 | 3.6 | 539.3 | 0.00668 | 668.1 |

TABLE 2b

| Metallocene | Activator | Mw (g/mol) | Mn (g/mol) | Mw/Mn | vinylenes | tri-sub | vinyls | vinylidenes | $T_m$ (DSC) °C. | ΔH J/g | Conv. % |
|---|---|---|---|---|---|---|---|---|---|---|---|
| A | 6 | 10,056 | 1,205 | 8.34 | 0.17 | 0.15 | 1.49 | 3.4 | 97.8 | 38.3 | 2.6 |
| A | 6 | 8,460 | 1,665 | 5.08 | 0.17 | 0.13 | 1.49 | 2.9 | 91.6 | 37.2 | 12.5 |
| A | 7 | 16,571 | 5593 | 2.96 | 0 | 0.03 | 0.87 | 0.26 | 93.3 114.4 | 45.3 | 20.5 |
| A | 7 | 20,807 | 7,192 | 2.89 | 0.07 | 0.11 | 1.63 | 0.35 | 103.5 115.7 | 49.5 | 15.9 |
| A | 8 | 20,795 | 7,628 | 2.73 | 0.04 | 0.08 | 0.99 | 0.41 | 57.2 96.1 110.1 | 44.7 | 22.7 |
| A | 8 | 20,947 | 7,629 | 2.78 | 0.04 | 0.01 | 0.77 | 0.46 | 58.7 87.2 | 43.2 | 7.6 |
| A | 9 | 27408 | 14263 | 1.92 | 0.02 | 0.07 | 1.05 | 0.39 | 105.1 | 59.5 | 14.6 |
| A | 9 | 28807 | 15701 | 1.83 | 0.04 | 0.07 | 0.69 | 0.34 | 114.5 | 52.9 | 9.0 |
| A | 7 | 39768 | 19095 | 2.1 | 0.06 | 0.1 | 0.52 | 0.47 | 18.1 103.9 116.4 | 57.9 | 3.6 |
| A | 7 | 16555 | 5877 | 2.82 | 0.08 | 0.2 | 2.26 | 0.34 | 89.9 103.8 126.4 136.2 | 47.9 | 34.8 |
| A | 8 | 29,540 | 14898 | 2 | 0.05 | 0.06 | 0.98 | 0.35 | 30.1 63.5 112.7 137.9 | 60.2 | 14.7 |

TABLE 2b-continued

| Metallocene | Activator | Mw (g/mol) | Mn (g/mol) | Mw/Mn | vinylenes | tri-sub | vinyls | vinylidenes | T$_m$ (DSC) °C. | ΔH J/g | Conv. % |
|---|---|---|---|---|---|---|---|---|---|---|---|
| A | 8 | 28021 | 12514 | 2.2 | 0.03 | 0.08 | 1.74 | 0.41 | 53.1<br>64.6<br>92.4<br>109.4<br>147.7 | 55.8 | 19.6 |
| A | 8 | 33364 | 16443 | 2.03 | 0.06 | 0.08 | 0.8 | 0.27 | 111.4 | 67 | 26.5 |
| A | 8 | 35071 | 15949 | 2.2 | 0.04 | 0.08 | 0.55 | 0.19 | 37.5<br>49.2<br>91.4<br>111.9 | 60.4 | 25.3 |
| B | 8 | 5052 | 1305 | 3.87 | 0.26 | 0.35 | 1.05 | 3.74 | | | 85.0 |
| B | 8 | 5527 | 1243 | 4.4 | 0.26 | 0.31 | 1.01 | 3.56 | | | 98.9 |
| C | 1 | 7100 | 2274 | 3.12 | 0.07 | 0.05 | 1.94 | 2.6 | 104.1 | 55.2 | 13.9 |
| C | 1 | 8789 | 2634 | 3.34 | 0.02 | 0.01 | 1.92 | 2.91 | 94.4 | 50.7 | 5.8 |
| C | 4 | 9028 | 3715 | 2.43 | 0.14 | 0.04 | 1.61 | 2.11 | 101.8 | 55.1 | 6.2 |
| C | 4 | 9889 | 4282 | 2.31 | 0.13 | 0.1 | 1.39 | 1.75 | 103.1 | 60.8 | 8.8 |

TABLE 3

(supported catalyst system - slurry polymerization):

| RXR | Product | Cat. | C2 = psig | Cat (g) | Tp. (C.) | Time (hr) | Yield (g) | Activity g/g/hr |
|---|---|---|---|---|---|---|---|---|
| L105 | PE | A-4/teal757 | 300 | 0.1 | 80 | 1 | 107 | 1070 |

| DSC | | | | GPC-DRI (g/mol) | | | |
|---|---|---|---|---|---|---|---|
| Tg, °C. | Tm, °C. | ΔH (J/g) | Tc, °C. | Mn | Mw | Mz | Mw/Mn |
| | 135.7 | 152.0 | 115.0 | 152,578 | 543,685 | 1,228,140 | 3.56 |

$^1$H NMR - (Unsat./1000 C.)

| vinylenes | olefins | vinyls | vinylidenes |
|---|---|---|---|
| 0.06 | 0.05 | 0.08 | 0.03 |

For following examples 2-4, the following characterization procedure was used. (For purposes of the claims the following GPC procedure shall be used.)

Molecular weights (number average molecular weight (Mn), weight average molecular weight (Mw), and z-average molecular weight (Mz)) and g'vis were determined using a Polymer Laboratories Model 220 high temperature SEC with on-line differential refractive index (DRI), light scattering, and viscometer detectors. It used three Polymer Laboratories PLgel 10 m Mixed-B columns for separation, a flow rate of 0.54 cm$^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Branching index in these examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples in these examples, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the comonomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticity as measured by Carbon 13 NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and $\alpha$ are as defined above.

Polymerization Example 2 (See FIGS. 2a, 2b)

Continuous Polymerization of Propylene

General polymerization procedure in a continuous stirred-tank reactor: all polymerizations were performed in a liquid filled, single-stage continuous reactor system. The reactor was a 0.5-liter stainless steel autoclave reactor and was equipped with a stirrer, a water cooling/steam heating element with a temperature controller, and a pressure controller. Solvents, propylene, and comonomers were first purified by passing through a three-column purification system. The purification system consisted of an Oxiclear column (Model #RGP-R1-500 from Labclear) followed by a 5 A and a 3 A molecular sieve column. Purification columns were regenerated periodically whenever there was evidence of lower activity of polymerization. Both the 3 A and 5 A molecular sieve columns were regenerated in-house under nitrogen at a set temperature of 260° C. and 315° C., respectively. The molecular sieve material was purchased from Aldrich. Oxiclear column was regenerated in the original manufacture. Ethylene was delivered as a gas solubilized in the chilled solvent/monomer mixture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The metallocenes were pre-activated with an activator (of formula (1) or (2) according to the present invention or a comparative activator) at a molar ratio of about 1:1 in toluene. The preactivated catalyst solution was kept in an inert atmosphere with <1.5 ppm water content and was fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of isohexane. The TNOA solution was stored in a 37.9-liter cylinder under nitrogen blanket. The solution was used for all polymerization runs until about 90% of consumption, and then a new batch was prepared. The feed rates of the TNOA solution were adjusted in a range from 0 (no scavenger) to 4 ml per minute to achieve a maximum catalyst activity.

The reactor was first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2 MPa.

Example 2 demonstrates the polymerization of propylene using rac-dimethylsilylbis(indenyl)hafnium dimethyl, see FIGS. 2a and 2b. The metallocene was pre-activated with an activator at a molar ratio of about 1:1 in toluene: The activators used were (1) N,N-dimethylanilinium tetrakis(pentafluorophenyl)borate (comparative, obtained from Albemarle), (2) $Me_3NH$ tetrakis(pentafluorophenyl)borate and (3) $Me_3NH$ tetrakis(heptafluoro-2-naphthyl)borate. The detailed polymerization conditions and some of analytical data for materials produced in these polymerization examples are listed in Tables 4a to 4c. For all the polymerizations, isohexane feed rate was 80 ml/min, propylene feed rate was 14 g/min. Polymerization examples listed in Tables 4c are comparative.

TABLE 4a

Polymerization of propylene using dimethylsilylbis(indenyl)hafnium dimethyl/Me₃NH tetrakis(pentafluorophenyl)borate

| | Example # | | | | |
|---|---|---|---|---|---|
| | 2-1 | 2-2 | 2-3 | 2-4 | 2-5 |
| Polymerization temperature (° C.) | 120 | 110 | 100 | 90 | 80 |
| Metallocene feed rate (mol/min) | 4.5E−07 | 4.5E−07 | 4.5E−07 | 4.5E−07 | 4.5E−07 |
| Conversion (%) | 66.8 | 67 | 65 | 55.1 | 37.9 |
| Mn (kg/mol) | 10.49 | 14.85 | 22.19 | 39.01 | 63.83 |
| Mw (kg/mol) | 25.24 | 32.70 | 47.32 | 74.32 | 121.36 |
| Mz (kg/mol) | 43.73 | 54.21 | 76.35 | 114.60 | 190.33 |
| g'vis | 0.95 | 0.95 | 0.97 | 0.98 | 1.01 |
| Tc (° C.) | 70.2 | 79.0 | 86.7 | 90.8 | 95.6 |
| Tm (° C.) | 104.9 | 113.9 | 122.6 | 128.8 | 133.4 |
| Tg (° C.) | −12.2 | −8.4 | −8.5 | | |
| Heat of fusion (J/g) | 51.6 | 69.0 | 71.8 | 84.3 | 88.2 |

TABLE 4a-continued

Polymerization of propylene using dimethylsilylbis(indenyl)hafnium dimethyl/Me$_3$NH tetrakis(pentafluorophenyl)borate

| | Example # | | | | |
|---|---|---|---|---|---|
| | 2-1 | 2-2 | 2-3 | 2-4 | 2-5 |
| Viscosity @ 190° C. (mPa · s) | 534 | 1090 | 4210 | 24500 | 128300 |
| Catalyst activity (kg polymer/g metallocene) | 42.09 | 42.21 | 40.95 | 34.72 | 23.88 |

TABLE 4b

Propylene polymerization using dimethylsilylbis(indenyl)hafnium dimethyl/Me$_3$HN tetrakis(heptafluoro-2-naphthyl) borate

| | Example # | | | | |
|---|---|---|---|---|---|
| | 2-6 | 2-7 | 2-8 | 2-9 | 2-10 |
| Polymerization temperature (° C.) | 120 | 110 | 100 | 90 | 80 |
| Metallocene feed rate (mol/min) | 6.1E−07 | 6.1E−07 | 6.1E−07 | 6.1E−07 | 6.1E−07 |
| Conversion (%) | 80.8 | 80.3 | 83.2 | 67.8 | 34.5 |
| Mn (kg/mol) | 10.01 | 15.75 | 20.66 | 25.36 | 28.46 |
| Mw (kg/mol) | 29.22 | 48.21 | 51.61 | 95.14 | 147.79 |
| Mz (kg/mol) | 54.58 | 91.20 | 94.39 | 173.59 | 272.41 |
| g'vis | 0.88 | 0.91 | 0.93 | 1.00 | 1.03 |
| Tc (° C.) | 53.1 | 72.0 | 77.7 | 92.8 | 98.1 |
| Tm (° C.) | 96.9 | 111.2 | 116.2 | 130.2 | 137.6 |
| Tg (° C.) | −10.4 | −8.9 | −8.9 | | |
| Heat of fusion (J/g) | 43.6 | 58.5 | 65.5 | 78.1 | 82.3 |
| Viscosity @ 190° C. (mPa · s) | 805 | 4105 | 5516 | 74830 | 345000 |
| Catalyst activity (kg polymer/g metallocene) | 37.70 | 37.47 | 38.82 | 31.64 | 16.10 |

TABLE 4c

Propylene polymerization using dimethylsilylbis(indenyl)hafnium dimethyl/N,N-dimethylanilinium tetrakis(pentafluorophenyl)borate (comparative)

| | Example # | | | | | | | |
|---|---|---|---|---|---|---|---|---|
| | 2-11 | 2-12 | 2-13 | 2-14 | 2-15 | 2-16 | 2-17 | 2-18 |
| Polymerization temperature (° C.) | 130 | 120 | 110 | 100 | 90 | 80 | 70 | 60 |
| Metallocene feed rate (mol/min) | 1.9E−06 | 1.9E−06 | 1.9E−06 | 1.9E−06 | 1.9E−06 | 1.9E−06 | 1.9E−06 | 1.9E−06 |
| Conversion (%) | 73.9 | 81.8 | 88.1 | 85.6 | 86.1 | 89.4 | 108.6 | 89.9 |
| Mn (kg/mol) | 3.12 | | 6.13 | | 15.59 | | 37.87 | |
| Mw (kg/mol) | 10.25 | | 16.35 | | 32.35 | | 79.08 | |
| Mz (kg/mol) | 153.99 | | 28.41 | | 52.22 | | 132.39 | |
| g'vis | 1.09 | | 0.95 | | 0.93 | | 0.95 | |
| Tc (° C.) | 32.3 | 39.9 | 49.3 | 59.6 | 68.4 | 81.6 | 91.7 | 97.8 |
| Tm (° C.) | 69.0 | 80.4 | 90.3 | 99.4 | 107.8 | 118.0 | 127.6 | 131.3 |
| Tg (° C.) | −26.8 | −17.6 | −19.5 | −11.7 | −8.2 | | | |
| Heat of fusion (J/g) | 19.6 | 23.6 | 35.6 | 44.5 | 56.5 | 61.2 | 67.7 | 73.3 |
| Viscosity @ 190° C. (mPa · s) | 43.1 | 85.3 | 131 | 311 | 877 | 3660 | 31100 | |
| Catalyst activity (kg polymer/g metallocene) | 10.95 | 12.13 | 13.05 | 12.68 | 12.75 | 13.24 | 16.08 | 13.31 |

Polymerization Example 3 (see FIGS. 3a, 3b)

Continuous Polymerization of Propylene

Example 3 demonstrates the polymerization of propylene using rac-dimethylsilylbis(indenyl)zirconium dimethyl, see FIGS. 3a and 3b. The metallocene was pre-activated with Me$_3$NH tetrakis(heptafluoro-2-naphthyl) borate at a molar ratio of about 1:1 in toluene. The same general polymerization procedure described above in Example 2 was used, and detailed polymerization conditions and some of the analytical data for materials produced in these polymerization examples are listed in Table 5a. For all the polymerization runs, isohexane feed rate was 80 ml/min, propylene feed rate was 14 g/min, and the metallocene feed rate was 7.835E-07 mole/min. As comparative examples, Table 5b lists the polymerization conditions and some characterization data for polypropylene produced using rac-dimethylsilylbis(indenyl)zirconium dimethyl preactived with dimethylanilinium tetrakis(heptafluoronaphthyl)borate at a molar ratio of about 1:1 in toluene.

TABLE 5a

Propylene polymerization using rac-dimethylsilylbis(indenyl) zirconium dimethyl/Me₃NH tetrakis(heptafluoro-2-naphthyl) borate

| | Example # | | | | |
|---|---|---|---|---|---|
| | 3-1 | 3-2 | 3-3 | 3-4 | 3-5 |
| Polymerization temperature (° C.) | 120 | 110 | 100 | 90 | 80 |
| Conversion (%) | 88.1 | 82.1 | 77.4 | 64.3 | 58.8 |
| Tc (° C.) | 51.0 | 57.7 | 77.1 | 89.8 | 96.3 |
| Tm (° C.) | 77.1 | 97.2 | 113.7 | 124.7 | 132.6 |
| Tg (° C.) | −18.6 | −13.9 | −10.9 | | |
| Heat of fusion (J/g) | 21.9 | 47.6 | 60.6 | 79.8 | 85.5 |
| Viscosity @ 190 C. (cp) | 65 | 167.5 | 360 | 705 | 1257 |
| Catalyst activity (kg polymer/g metallocene) | 38.61 | 35.98 | 33.92 | 28.18 | 25.77 |

TABLE 5b

Propylene polymerization using rac-dimethylsilylbis(indenyl) zirconium dimethyl/ dimethylanilinium tetrakis(heptafluoronaphthyl) borate (comparative)

| | Example # | | | | |
|---|---|---|---|---|---|
| Polymerization temperature (° C.) | 120 | 110 | 100 | 90 | 80 |
| Cat (mol/min) | 7.835E−07 | 7.835E−07 | 7.835E−07 | 7.835E−07 | 7.835E−07 |
| Propylene (g/min) | 14 | 14 | 14 | 14 | 14 |
| Yield (g/min) | 11.1 | 11.1 | 11.1 | 11.1 | 10.9 |
| Conversion (%) | 79.3 | 79.4 | 79.1 | 79.2 | 77.9 |
| Tc (° C.) | 25.3 | 44.6 | 68.6 | 83.8 | 91.9 |
| Tm (° C.) | 69.9 | 89.8 | 106.4 | 119.1 | 128.0 |
| Tg (° C.) | −20.4 | −14.7 | −12.8 | | |
| Heat of fusion (J/g) | 26.3 | 42.1 | 56.5 | 69.9 | 81.7 |
| Viscosity @ 190 C. (mPa · s) | 41.7 | 103 | 245 | 538 | 1120 |
| Catalyst activity (kg polymer/g metallocene) | 34.75 | 34.80 | 34.66 | 34.71 | 34.14 |

Polymerization Example 4

Continuous Polymerization of Ethylene/Propylene

Example 4 demonstrates the polymerization of ethylene/propylene copolymer using rac-dimethylsilylbis(indenyl) hafnium dimethyl pre-activated with a trimethylammonium tetrakis(pentafluorophenyl)borate at a molar ratio of about 1:1 in toluene. The polymerization runs were generally carried out according to the procedure described above for Example 2.

TABLE 6

Polymerization of ethylene/propylene copolymers using rac-dimethylsilylbis(indenyl) hafnium dimethyl/trimethylammonium tetrakis(pentafluorophenyl)borate

| | Example # | | | | | |
|---|---|---|---|---|---|---|
| | 4-1 | 4-2 | 4-3 | 4-4 | 4-5 | 4-6 |
| Polymerization temperature (° C.) | 90 | 90 | 90 | 90 | 90 | 90 |
| Propylene feed rate (g/min) | 14 | 14 | 14 | 14 | 14 | 14 |
| Ethylene feed rate (SLPM) | 0.5 | 0.7 | 0.9 | 1.2 | 1.5 | 2 |
| Isohexane feed rate (ml/min) | 80 | 80 | 80 | 80 | 80 | 80 |
| Metallocene feed rate (mol/min) | 2.7E−07 | 2.7E−07 | 2.7E−07 | 2.7E−07 | 2.7E−07 | 2.7E−07 |
| Conversion (%) | 44.1 | 48.3 | 52 | 45.3 | 46.1 | 45.8 |
| Mn(kg/mol) | 29.733 | 23.03 | 30.009 | 19.579 | 15.848 | 25.868 |
| Mw (kg/mol) | 92.85 | 87.915 | 88.199 | 86.887 | 81.576 | 88.374 |
| Mz (kg/mol) | 157.77 | 153.426 | 150.387 | 150.825 | 148.804 | 152.828 |
| Mw/Mn | 3.12 | 3.82 | 2.94 | 4.44 | 5.15 | 3.42 |
| g'vis | 0.957 | 0.961 | 0.959 | 0.98 | 0.886 | 0.941 |
| Tc (° C.) | 31.46 | 14.52 | 11.05 | | | |
| Tm (° C.) | 79.27 | 68.97 | 59.44 | | | |
| Tg (° C.) | −22.07 | −24.1 | −26.65 | −29.24 | −32.02 | −31.38 |
| Heat of fusion (J/g) | 36.05 | 27.15 | 13.05 | | | |
| Ethylene content (wt %) | 12.35 | 12.7 | 15.24 | 20.51 | 27.51 | 20.7 |
| Viscosity @190° C. (mPa · s) | 166000 | 140000 | 140000 | 170000 | 184000 | 260000 |

SLPM = standard liter per minute.

Polymerization Example 5

Continuous Polymerization of Propylene

Example 5 demonstrates the polymerization of propylene using rac-dimethylsilyl bis(2-methyl-4-phenylindenyl)zirconium dimethyl. The metallocene was pre-activated with $Me_3NH$ tetrakis(pentafluorophenyl)borate at a molar ratio of about 1:1 in toluene. The same general polymerization procedure described above in Example 2 was used, and detailed polymerization conditions and some of the analytical data for materials produced in these polymerization examples are listed in Table 7. For all the polymerization runs, isohexane was used a solvent and the feed rate was 80 ml/min, propylene feed rate was 14 g/min, and the metallocene feed rate was 4.545E-07 mole/min.

TABLE 7

Polymerization of propylene using rac-dimethylsilyl bis(2-methyl-4-phenylindenyl) zirconium dimethyl/$Me_3NH$ tetrakis(pentafluorophenyl)borate

| | Example # | | | | |
|---|---|---|---|---|---|
| | 5-1 | 5-2 | 5-3 | 5-4 | 5-5 |
| Polymerization temperature (° C.) | 130 | 120 | 110 | 100 | 90 |

TABLE 7-continued

Polymerization of propylene using rac-dimethylsilyl bis(2-methyl-4-phenylindenyl) zirconium dimethyl/$Me_3NH$ tetrakis(pentafluorophenyl)borate

| | Example # | | | | |
|---|---|---|---|---|---|
| | 5-1 | 5-2 | 5-3 | 5-4 | 5-5 |
| Conversion (%) | 89.2 | 91 | 92 | 92.4 | 93.8 |
| Mn (kg/mol) | 3.9 | 5.6 | 8.5 | 12.2 | 16.2 |
| Mw (kg/mol) | 11.5 | 17.2 | 26.5 | 39.9 | 63.2 |
| Mz (kg/mol) | 22.0 | 33.0 | 50.2 | 77.6 | 135.8 |
| g'vis | 0.82 | 0.82 | 0.81 | 0.83 | 0.83 |
| Tc (° C.) | 84.3 | 91.6 | 99.4 | 103.7 | 107.4 |
| Tm (° C.) | 122.3 | 129.5 | 137.3 | 143.2 | 149.1 |
| Tg (C) | | | | | |
| Heat of fusion (J/g) | 76.7 | 83.0 | 90.4 | 95.4 | 100.0 |
| Viscosity @190° C. (mPa · s) | 93.9 | 185 | 504 | 1670 | 9750 |
| productivity (kg polymer/g metallocene) | 46.83 | 47.78 | 48.30 | 48.51 | 49.25 |

Additional batch propylene polymerizations were run according to the procedure in Example 1, except that 100 mls of propylene were used, the run temperature was 120° C., and the run time was 20 minutes. The data are reported in Table 7a and 7b.

TABLE 7a

| Example | MCN | Act | Polymer yield, g | Metal complex, mg | Metal complex Mw | Metal mmol | Activity, gPP/mmol Met | Activity, gPP/mmolMet · mL PP |
|---|---|---|---|---|---|---|---|---|
| 7-1 | B | 7 | 34.37 | 2.3 | 377.2 | 0.00610 | 5636.7 | 56.4 |
| 7-2 | B | 7 | 49.45 | 2.3 | 377.2 | 0.00610 | 8109.8 | 81.1 |
| 7-3 | C | 7 | 12.27 | 3.6 | 539.3 | 0.00668 | 1838.1 | 18.4 |
| 7-4 | C | 7 | 11.12 | 3.6 | 539.3 | 0.00668 | 1665.8 | 16.7 |

TABLE 7b

| Ex | Mw (g/mol) | Mn (g/mol) | Mw/Mn | vinylenes | trisub | vinyls | vinylidenes | ΔH, (J/g) | Conversion (%) |
|---|---|---|---|---|---|---|---|---|---|
| 7-1 | 4790 | 1098 | 4.4 | 0.32 | 0.36 | 1.03 | 4.19 | | 68.1 |
| 7-2 | 4992 | 1157 | 4.31 | 0.26 | 0.31 | 1.02 | 3.82 | | 97.9 |
| 7-3 | 17498 | 8052 | 2.2 | 0.01 | 0.01 | 1.69 | 0.39 | 64.5 | 24.3 |
| 7-4 | 17675 | 8609 | 2.1 | 0.03 | 0.08 | 1.48 | 0.32 | 72.5 | 22.0 |

Melting point for the polymer in 7-5 was 108° C.

Polymerization Example 6

Continuous Polymerization of Propylene/Ethylene

Example 6 demonstrates the polymerization of inventive propylene/ethylene copolymers using rac-dimethylsilylbis(indenyl)hafnium dimethyl pre-activated with a trimethylammonium tetrakis(pentafluorophenyl)borate at a molar ratio of about 1:1 in toluene. Comparative polymers were also produced using rac-dimethylsilylbis(indenyl)hafnium dimethyl pre-activated with dimethylanilinium tetrakis(pentafluorophenyl)borate at a molar ratio of about 1:1 in toluene. The same general polymerization procedure described above in Example 2 was used, and detailed polymerization conditions and resin properties of the resulting copolymers are listed in Tables 8a and 8b. Table 8a (run nos. 6-1 through 6-6) shows comparative polymers, while Table 8b (run nos. 6-7 through 6-12) illustrates polymers according to the present invention.

TABLE 8a

Polymerization of propylene/ethylene copolymers using rac-dimethylsilylbis(indenyl)hafnium dimethyl/dimethylanilinium tetrakis(pentafluorophenyl)borate

| | Example # | | | | | |
|---|---|---|---|---|---|---|
| | 6-1 | 6-2 | 6-3 | 6-4 | 6-5 | 6-6 |
| Polymerization temperature (° C.) | 90 | 90 | 90 | 90 | 90 | 90 |
| Propylene feed rate (g/min) | 14 | 14 | 14 | 14 | 14 | 14 |
| Ethylene feed rate (SLPM) | 0.2 | 0.5 | 0.7 | 0.9 | 1.2 | 1.5 |
| Isohexane feed rate (ml/min) | 80 | 80 | 80 | 80 | 80 | 80 |
| Metallocene feed rate (mol/min) | 2.7E−07 | 2.7E−07 | 2.7E−07 | 2.7E−07 | 2.3E−07 | 2.3E−07 |
| Yield (g/min) | 8.1 | 10.3 | 10.2 | 10.5 | 9.5 | 10.0 |
| Tc (° C.) | 60.88 | 39.39 | 20.85 | 15.83 | N/A | N/A |
| Tm (° C.) | 102.02 | 84.61 | 72.45 | 60.59 | N/A | N/A |
| Tg (° C.) | −14.87 | −19.77 | −21.87 | −24.56 | −29.48 | −27.04 |
| Heat of Fusion (J/g) | 54.44 | 41.88 | 31.32 | 14.41 | N/A | N/A |
| Ethylene (wt %) | 2.8 | 5.0 | 7.8 | 8.4 | 20.0 | 16.0 |

SLPM = standard liter per minute.

TABLE 8b

Polymerization of propylene/ethylene copolymers using rac-dimethylsilylbis(indenyl)hafnium dimethyl/trimethylammonium tetrakis(pentafluorophenyl)borate

| | Example # | | | | | |
|---|---|---|---|---|---|---|
| | 6-7 | 6-8 | 6-9 | 6-10 | 6-11 | 6-12 |
| Polymerization temperature (° C.) | 90 | 90 | 90 | 90 | 90 | 90 |
| Propylene feed rate (g/min) | 14 | 14 | 14 | 14 | 14 | 14 |
| Ethylene feed rate (SLPM) | 0.2 | 0.5 | 0.7 | 0.9 | 1.2 | 1.5 |
| Isohexane feed rate (ml/min) | 80 | 80 | 80 | 80 | 80 | 80 |
| Metallocene feed rate (mol/min) | 3.4E−07 | 3.4E−07 | 3.4-07 | 3.4-07 | 3.4E−07 | 3.4E−07 |
| Yield (g/min) | 9.8 | 9.6 | 9.7 | 9.9 | 10.4 | 12.2 |
| Tc (° C.) | 62.15 | 35.49 | 15.54 | 12.72 | 28.45 | N/A |
| Tm (° C.) | 102.13 | 84.16 | 71.99 | 60.66 | 59.78 | N/A |
| Tg (° C.) | −14.44 | −20.82 | −21.73 | −24.36 | −27.48 | −28.51 |
| Heat of Fusion (J/g) | 57.80 | 38.53 | 29.92 | 12.70 | 2.10 | N/A |
| Ethylene (wt %) | 4.17 | 7.35 | 13.22 | 11.89 | 15.77 | 17.43 |
| Fa (%) | 0.6 | 3.8 | — | — | — | 88.5 |
| $T_{75}$ (° C.) | 58.25 | 40.2 | — | — | — | — |
| $T_{25}$ (° C.) | 46.9 | 27.5 | — | — | — | — |

SLPM = standard liter per minute.

FIG. 4 shows melting temperature as a function of ethylene content for the polymers produced in example 6. It is evident from FIG. 4 that changing the activator used to prepare the polymers allows one to achieve greater melting temperatures at comparable ethylene content levels.

FIG. 5 shows TREF curves for two polymers of Example 6 having similar ethylene content levels, specifically examples 6-3 and 6-8. It is clear from FIG. 5 that the inventive polymer of example 6-8 has a much narrower composition distribution than comparative polymer 6-3.

Figure 6:
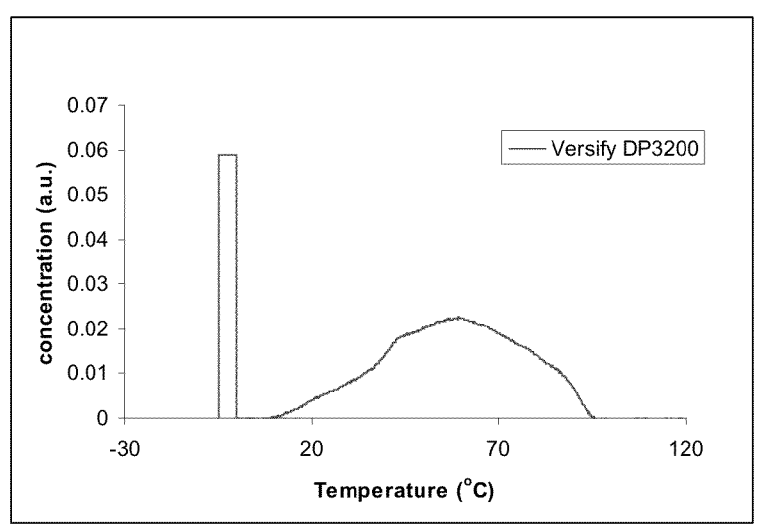
FIG. 6 shows Temperature Rising Elution Fractionation (TREF) results for a comparative commercial polymer available under the tradename VERSIFY™DP3200 from The Dow Chemical Company.

FIG. 6 shows TREF results for a commercial polymer available under the tradename Versify™DP3200 from The Dow Chemical Company, for comparative purposes.

Polymerization Example 7

Continuous Polymerization of Propylene/Ethylene

Example 7 demonstrates the polymerization of inventive propylene/ethylene copolymers using rac-dimethylsilylbis (indenyl)hafnium dimethyl pre-activated with a trimethylammonium tetrakis(pentafluorophenyl)borate at a molar ratio of about 1:1 in toluene.

Polymers in Example 7 were synthesized in one continuous stirred tank reactor using the following general polymerization procedure. The polymerization was performed in solution, using hexane as a solvent. In the reactor, polymerization was performed at a temperature of 65-70° C., the ethylene and propylene feed rates are listed in Table 9. In the process, the reaction temperature was used to achieve the desired MFR. The catalyst, activated externally to the reactor, was added as needed in amounts effective to maintain the target polymerization temperature.

The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer was cooled until solid. Resin properties of the resulting copolymers are listed in Table 9.

TABLE 9

Polymerization of propylene/ethylene copolymers using rac-dimethylsilylbis(indenyl) hafnium dimethyl/trimethylammonium tetrakis(pentafluorophenyl)borate

| | Example # | | |
|---|---|---|---|
| | 7-1 | 7-2 | 7-2 |
| Polymerization temperature (° C.) | 70 | 65 | 65 |
| Propylene feed rate (g/h) | 760.75 | 759.32 | 764.79 |
| Ethylene feed rate (g/h) | 76.8 | 76.8 | 57.6 |
| Isohexane feed rate (ml/min) | 3564 | 3564 | 3564 |
| Metallocene feed rate (g/h) | 0.00516 | 0.00516 | 0.00516 |
| Yield (g/h) | 177.5 | 208.6 | 119.5 |
| Tc (° C.) | No melt | No melt | No melt |
| Tm (° C.) | No melt | No melt | No melt |
| Heat of Fusion (J/g) | No melt | No melt | No melt |
| Ethylene (wt %) | 20.91 | 20.00 | 17.24 |

Certain embodiments and features have been described herein using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, any patents, test procedures, or other documents cited in this application are fully incorporated by reference to the extent such disclosure is not inconsistent with this application and for all jurisdictions in which such incorporation is permitted.

As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A copolymer composition comprising units derived from propylene and ethylene, where the copolymer comprises from about 0.1 to about 20 wt % units derived from ethylene, and:
   i. the density of the copolymer composition is less than about 0.970 g/cc,
   ii. the heat of fusion of the copolymer composition is less than about 75 J/g,
   iii. the melting point of the composition satisfies the relation $T_m > -6.2*e + 125$, where e is the ethylene content of the composition in wt % and Tm is the melting point in degrees Celsius,
   iv. the copolymer is prepared using one or more metallocene catalysts, and
   v. the copolymer composition has a $T_{75} - T_{25}$ value of less than 20, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

2. The copolymer composition of claim 1, wherein the copolymer comprises from about 2 to about 20 wt % units derived from ethylene.

3. The copolymer composition of claim 2, wherein the composition comprises from about 3 to about 16 wt % units derived from ethylene.

4. The copolymer composition of claim 3, wherein the composition comprises from about 5 to about 14 wt % units derived from ethylene.

5. The copolymer composition of claim 1, wherein the density of the composition is less than about 0.940 g/cc.

6. The copolymer composition of claim 5, wherein the density of the composition is from about 0.860 to about 0.900 g/cc.

7. The copolymer composition of claim 1, wherein the molecular weight of the copolymer is from about 20,000 to about 400,000 g/mol.

8. The copolymer composition of claim 1, wherein the molecular weight distribution of the copolymer is from about 2.0 to about 2.4.

9. The copolymer composition of claim 1, wherein the soluble fraction, $F_a$, of the copolymer satisfies the following relation:

$$F_a < 7*e + 35,$$

where e is the ethylene content of the composition in wt %, where the soluble fraction, Fa, is measured at −15° C. in a solution of orthodichlorbenzene.

10. The copolymer composition of claim 1, wherein the soluble fraction, $F_a$, of the copolymer satisfies the following relation:

$$F_a < 7*e+38,$$

where e is the ethylene content of the composition in wt %, where the soluble fraction, Fa, is measured at −15° C. in a solution of orthodichlorbenzene.

11. The copolymer composition of claim 1, wherein the soluble fraction, $F_a$, of the copolymer satisfies the following relation:

$$F_a < 7*e+40,$$

where e is the ethylene content of the composition in wt %, where the soluble fraction, Fa, is measured at −15° C. in a solution of orthodichlorbenzene.

12. An article comprising the copolymer composition of claim 1.

13. The article of claim 12, where the article is a film, fiber, nonwoven fabric, or molded article.

14. A polymer pellet comprising the copolymer composition of claim 1.

* * * * *

UNITED STATES PATENT AND TRADEMARK OFFICE
CERTIFICATE OF CORRECTION

| | | |
|---|---|---|
| PATENT NO. | : 8,835,587 B2 | Page 1 of 1 |
| APPLICATION NO. | : 14/049558 | |
| DATED | : September 16, 2014 | |
| INVENTOR(S) | : Donna J. Crowther et al. | |

It is certified that error appears in the above-identified patent and that said Letters Patent is hereby corrected as shown below:

On the Title Page, Item (72)

Inventor Donna J. Crowthers should read:

-- Donna J. Crowther --

Signed and Sealed this
Third Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,835,587 B2 | Page 1 of 1 |
| APPLICATION NO. | : 14/049558 | |
| DATED | : September 16, 2014 | |
| INVENTOR(S) | : Donna J. Crowther et al. | |

It is certified that error appears in the above-identified patent and that said Letters Patent is hereby corrected as shown below:

On the Title Page,

Item (12) should be corrected to read -- Crowther --

Item (72) Inventor Donna J. Crowthers should read:

-- Donna J. Crowther --

This certificate supersedes the Certificate of Correction issued February 3, 2015.

Signed and Sealed this
Third Day of March, 2015

Michelle K. Lee
*Deputy Director of the United States Patent and Trademark Office*